United States Patent
Liu et al.

(10) Patent No.: US 12,402,166 B2
(45) Date of Patent: Aug. 26, 2025

(54) CHANNEL OCCUPANCY TIME (COT) MAINTENANCE FOR SIDELINK COMMUNICATIONS IN UNLICENSED BANDS

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 17/740,059

(22) Filed: May 9, 2022

(65) Prior Publication Data

US 2023/0362988 A1    Nov. 9, 2023

(51) Int. Cl.
*H04W 74/08* (2024.01)
*H04L 5/00* (2006.01)
(Continued)

(52) U.S. Cl.
CPC ....... *H04W 74/0808* (2013.01); *H04L 5/0055* (2013.01); *H04W 72/20* (2023.01)

(58) Field of Classification Search
CPC ... H04W 28/04; H04W 72/04; H04W 72/042; H04W 88/08; H04W 74/0808;
(Continued)

(56) References Cited

U.S. PATENT DOCUMENTS

| 11,647,540 B2 * | 5/2023 | Lee ......................... H04W 4/40 370/329 |
| 2020/0288286 A1 * | 9/2020 | Hwang ............... H04L 27/2607 |

(Continued)

FOREIGN PATENT DOCUMENTS

| EP | 4 346 302 A1 * | 4/2024 | ............ H04W 72/02 |
| EP | 4 444 024 A1 * | 10/2024 | ............ H04W 76/14 |

(Continued)

OTHER PUBLICATIONS

3GPP TSG RAN WG1 #109-e, e-Meeting, May 9-20, 2022, R1-2203562, Source: vivo, Title: Physical channel design framework for sidelink on unlicensed spectrum, Agenda Item: 9.4.1.2. (Year: 2022).*

(Continued)

*Primary Examiner* — Peter G Solinsky
*Assistant Examiner* — Sanjay K Dewan
(74) *Attorney, Agent, or Firm* — Arun Swain

(57) ABSTRACT

A method of wireless communication performed by a first wireless communication device may maintain a channel occupancy time (COT) in a shared frequency band during at least one physical sidelink feedback channel (PSFCH) instance. In some aspects, the method includes transmitting, in a first portion of a COT based on a listen-before talk (LBT), a first sidelink (SL) communication comprising SL communication information (SCI), the SCI indicating a second wireless communication device to transmit a signal in at least one gap symbol preceding a PSFCH resource. The method further includes receiving, from the second wireless communication device, the signal during the at least one gap symbol. The method further includes transmitting, in a second portion of the COT based on the LBT, a second SL communication, wherein the second portion of the COT is subsequent to the PSFCH resource.

26 Claims, 13 Drawing Sheets

(51) Int. Cl.
*H04W 72/04* (2023.01)
*H04W 72/20* (2023.01)
*H04W 74/0808* (2024.01)

(58) Field of Classification Search
CPC .............. H04W 72/20; H04W 72/0406; H04L 5/0007; H04L 5/0055
USPC .......................................................... 370/329
See application file for complete search history.

(56) References Cited

U.S. PATENT DOCUMENTS

| | | | | |
|---|---|---|---|---|
| 2022/0159712 | A1* | 5/2022 | Myung | H04L 5/0053 |
| 2022/0279581 | A1* | 9/2022 | Baek | H04W 64/00 |
| 2023/0064680 | A1* | 3/2023 | Huang | H04L 1/1812 |
| 2023/0064829 | A1* | 3/2023 | Yang | H04W 74/0808 |
| 2023/0299892 | A1* | 9/2023 | Si | H04L 1/1861 370/329 |
| 2024/0292462 | A1* | 8/2024 | Wang | H04W 74/0808 |

FOREIGN PATENT DOCUMENTS

| | | | | |
|---|---|---|---|---|
| WO | WO 2021/013811 A1 * | 1/2021 | ............ | H04W 72/04 |
| WO | WO 2021/208031 A1 * | 10/2021 | ................ | H04L 1/18 |
| WO | WO 2024/032324 A1 * | 2/2024 | ............ | H04L 1/1812 |
| WO | WO 2024/035935 A1 * | 2/2024 | ............ | H04W 72/25 |

OTHER PUBLICATIONS

3GPP TSG-RAN WG1 #109-e, e-Meeting, May 9-May 20, 2022, R1-2205034, Agenda item: 9.4.1.2, Source: Qualcomm Incorporated, Title: Physical Channel Design for Sidelink on Unlicensed Spectrum. (Year: 2022).*

International Search Report and Written Opinion—PCT/US2023/018722—ISA/EPO—Aug. 8, 2023.

Qualcomm Incorporated: "Physical Channel Design for Side link on Unlicensed Spectrum", R1-2205034, 3GPP TSG-RAN WG1 #109-e, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052144140, 14 Pages, p. 2, Section 2.1.1-p. 3, Section 2.1.1.2.

VIVO: "Physical Channel Design Framework for Sidelink on Unlicensed Spectrum", R1-2203562, 3GPP TSG RAN WG1 #109-e, 3rd Generation Partnership Project, Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, 6 Pages, XP052153037, Section 2.4.

* cited by examiner

CHANNEL OCCUPANCY TIME (COT) MAINTENANCE FOR SIDELINK COMMUNICATIONS IN UNLICENSED BANDS

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a first wireless communication device includes: transmitting, in a first portion of a channel occupancy time (COT) based on a listen-before talk (LBT), a first sidelink (SL) communication comprising SL communication information (SCI), the SCI indicating a second wireless communication device to transmit a signal in at least one gap symbol preceding a physical sidelink feedback channel (PSFCH) resource; receiving, from the second wireless communication device, the signal during the at least one gap symbol; and transmitting, in a second portion of the COT based on the LBT, a second SL communication, wherein the second portion of the COT is subsequent to the PSFCH resource.

According to another aspect of the present disclosure, a method of wireless communication performed by a first wireless communication device includes: performing a listen-before-talk (LBT) to initiate a channel occupancy time (COT); and transmitting, based on the LBT, a first sidelink (SL) communication in the COT, the first SL communication including SL communication information (SCI) and SL data, the COT including SL data resources and SL feedback resources, wherein the SL data is rate-matched to occupy the SL data resources and at least a portion of the SL feedback resources.

According to another aspect of the present disclosure, a first wireless communication device includes: a memory; a transceiver; and a processor in communication with the memory and the transceiver, wherein the first wireless communication device is configured to: transmit, in a first portion of a channel occupancy time (COT) based on a listen-before talk (LBT), a first sidelink (SL) communication comprising SL communication information (SCI), the SCI indicating a second wireless communication device to transmit a signal in at least one gap symbol preceding a physical sidelink feedback channel (PSFCH) resource; receive, from the second wireless communication device, the signal during the at least one gap symbol; and transmit, in a second portion of the COT based on the LBT, a second SL communication, wherein the second portion of the COT is subsequent to the PSFCH resource.

According to another aspect of the present disclosure, a first wireless communication device includes: a memory; a transceiver; and a processor in communication with the memory and the transceiver, wherein the first wireless communication device is configured to: perform a listen-before-talk (LBT) to initiate a channel occupancy time (COT); and transmit, based on the LBT, a first sidelink (SL) communication in the COT, the first SL communication including SL communication information (SCI) and SL data, the COT including SL data resources and SL feedback resources, wherein the SL data is rate-matched to occupy the SL data resources and at least a portion of the SL feedback resources.

According to another aspect of the present disclosure, a non-transitory, computer-readable medium comprises program code recorded thereon, where the program code comprises instructions executable by a processor of a first wireless communication device to cause the first wireless communication device to: transmit, in a first portion of a channel occupancy time (COT) based on a listen-before talk (LBT), a first sidelink (SL) communication comprising SL communication information (SCI), the SCI indicating a second wireless communication device to transmit a signal in at least one gap symbol preceding a physical sidelink feedback channel (PSFCH) resource; receive, from the second wireless communication device, the signal during the at least one gap symbol; and transmit, in a second portion of the COT based on the LBT, a second SL communication, wherein the second portion of the COT is subsequent to the PSFCH resource.

According to another aspect of the present disclosure, a non-transitory, computer-readable medium comprises program code recorded thereon, where the program code comprises instructions executable by a processor of a first wireless communication device to cause the first wireless communication device to: perform a listen-before-talk (LBT) to initiate a channel occupancy time (COT); and transmit, based on the LBT, a first sidelink (SL) communication in the COT, the first SL communication including SL communication information (SCI) and SL data, the COT including SL data resources and SL feedback resources, wherein the SL data is rate-matched to occupy the SL data resources and at least a portion of the SL feedback resources.

According to another aspect of the present disclosure, a first wireless communication device comprises: means for transmitting, in a first portion of a channel occupancy time (COT) based on a listen-before talk (LBT), a first sidelink (SL) communication comprising SL communication information (SCI), the SCI indicating a second wireless communication device to transmit a signal in at least one gap symbol preceding a physical sidelink feedback channel (PSFCH) resource; means for receiving, from the second wireless communication device, the signal during the at least one gap symbol; and means for transmitting, in a second portion of the COT based on the LBT, a second SL communication, wherein the second portion of the COT is subsequent to the PSFCH resource.

According to another aspect of the present disclosure, a first wireless communication device comprises: means for performing a listen-before-talk (LBT) to initiate a channel occupancy time (COT); and means for transmitting, based on the LBT, a first sidelink (SL) communication in the COT, the first SL communication including SL communication information (SCI) and SL data, the COT including SL data resources and SL feedback resources, wherein the SL data is rate-matched to occupy the SL data resources and at least a portion of the SL feedback resources.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
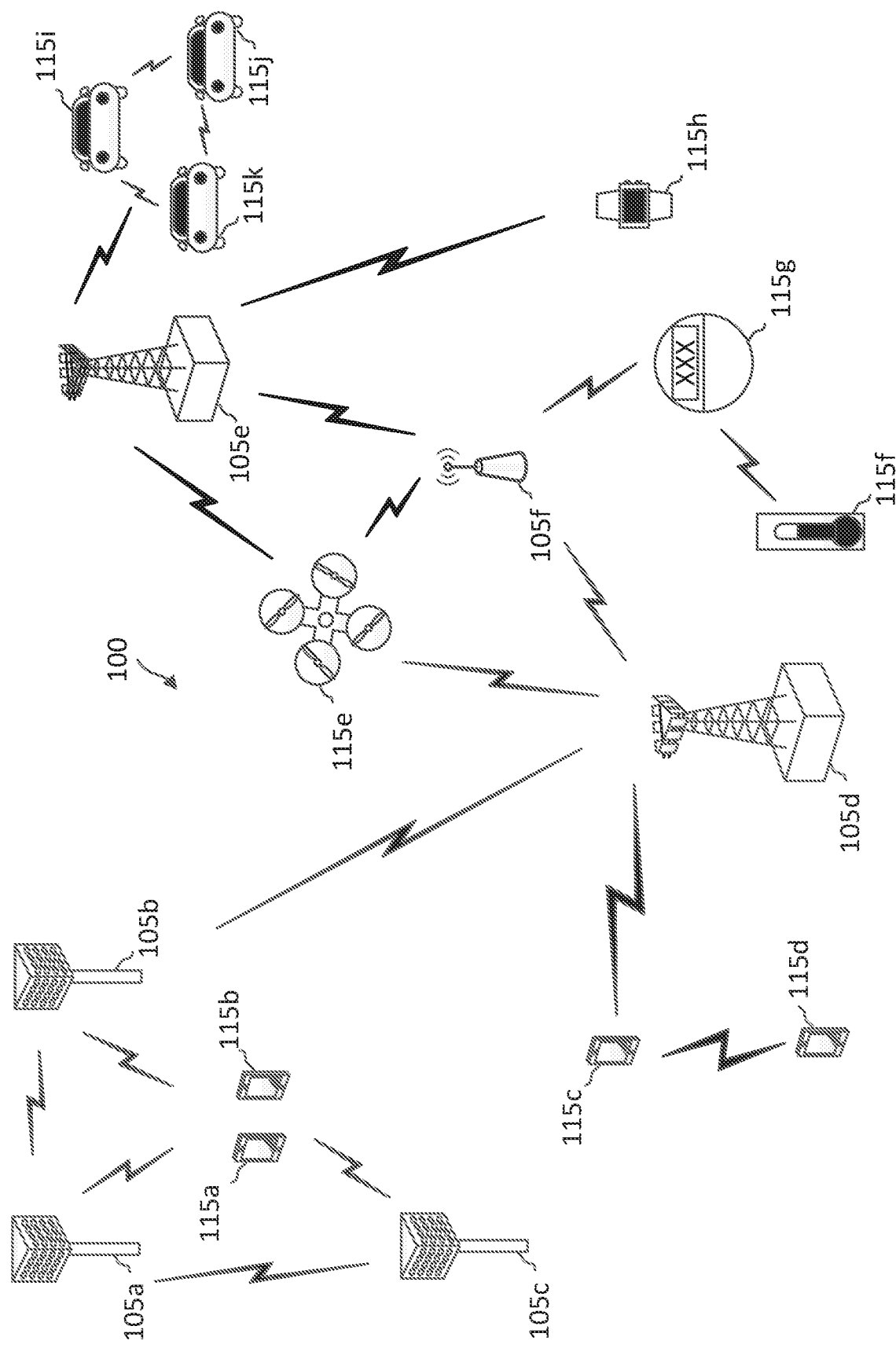
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspect, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include vehicle-to-everything (V2X), industrial IoT (IIoT), and/or NR-lite.

UEs communicating using a sidelink interface may be configured to respond to sidelink communications from other UEs with hybrid automatic repeat request (HARQ) feedback indicating whether one or more sidelink transport blocks (TBs) were successfully received or not. In some aspects, the UEs may be configured with sidelink feedback resources mapped to one or more SL data resources. For example, the UEs may be configured with physical sidelink feedback channel (PSFCH) resources. The PSFCH resources may include one or more periodic PSFCH instances. Each PSFCH instance may be associated with a PSFCH period including one or more slots. In some aspect, the UEs may communicate at least one PSSCH communication in each slot. Further, the UEs may be configured to communicate using shared or unlicensed frequency resources. These communications may be referred to as sidelink-unlicensed (SL-U). To communicate in the shared or unlicensed frequency resources, one or more UEs may perform a clear channel assessment (CCA). For example, a UE may perform a listen-before-talk (LBT) procedure by obtaining channel measurements for a fixed or variable amount of time. If the channel measurements fall below a configured threshold, the UE may initiate or acquire a channel occupancy time (COT) to communicate with one or more other UEs. In some aspects, communications from one UE to another specific UE may be referred to as unicast communications. Communications from one or more UEs to one or more other UEs may be referred to as groupcast or multicast communications.

Each acquired COT may provide a limited amount of time to transmit and/or receive SL communications. For example, each COT may include one or more slots, where each slot comprises a plurality of symbols allocated for different types of SL signals and/or data. For example, each slot may include one or more portions allocated for SCI, and one or more portions allocated for SL data. Further, the UEs may be configured with periodic PSFCH resources which may have a periodicity of one slot or more than one slot. In some aspects, the UEs may be configured with one or more gap symbols between a SL data portion and a PSFCH resource. In this regard, in some aspects, communicating PSFCH information may involve a switch in link direction (e.g., transmit to receive, receive to transmit). However, wireless communication devices using shared or unlicensed frequency resources may operate based on requirements of continuity during the COT. For example, if a UE refrains from communications for more than a configured duration during the COT, the UE may be prevented from continuing communications in the COT after the gap. In some instances, the configured duration may be about 16 microseconds (μs). In other instances, the configured duration may be about 25 μs. However, the duration of a single symbol may be more than 25 μs. Accordingly, if a PSFCH resource includes a configured gap symbol, and the PSFCH resource is scheduled in the middle of a COT where there is a burst of SL transmissions and/or receptions, the UE may be prevented from continuation communications in the COT after a PSFCH instance.

The present disclosure provides systems, schemes, and mechanisms for maintaining COTs for sidelink communications in shared frequency bands. In some aspects, mechanisms for maintaining COTs include a first wireless communication device indicating a second wireless communication device to transmit a signal in at least one symbol between a sidelink communication channel and a sidelink feedback instance. In some aspects, the sidelink feedback instance may be a PSFCH instance. In some aspects, the signal may include a cyclic prefix (CP). In another aspect, the signal may include an extension of a CP. The extension may be referred to as a CP extension (CPE). In some aspects, transmitting the signal may include transmitting sidelink ACK/NACK in a PSFCH instance with a CPE extending at least partially within the at least one gap symbol. The second wireless communication device may transmit the signal in the at least one gap symbol such that a remaining gap between a PSSCH and a PSFCH communication is less than 25 μs. In another aspect, the second wireless communication device may transmit the signal such that the gap between the PSSCH and the PSFCH is less than about 16 μs. According to another aspect of the present disclosure, the first wireless communication device may indicate the second wireless communication device to transmit a filler signal or pattern signal in the at least one PSF see instance. For example, in some instances, the first wireless communication device may not expect to receive PSFCH communications from the second wireless communication device. Further, the first wireless communication device may not have sidelink feedback data to communicate in the PSFCH instance. Accordingly, the first wireless communication device may indicate the second wireless communication device to transmit the padding signal, where the padding signal is based on a PSFCH waveform. In some aspects, transmitting the padding signal may include transmitting a CPE with the PSFCH-based padding signal. In some aspects, the CPE may be transmitted in at least one gap symbol between the PSSCH and the PSFCH instance. According to another aspect of the present disclosure, a mechanism for maintaining a COT may include rate matching sidelink data to extend over the at least one gap symbol and/or the PSFCH instance.

According to another aspect of the present disclosure, a first wireless communication device may rate match a sidelink communication to extend at least partially over a PSFCH resource. For example, the first wireless communication device may be configured to rate match a PSSCH communication to extend over at least one gap symbol, at least one AGC symbol, and/or at least one PSFCH symbol such that a gap between the end of the rate-matched first SL communication and the beginning of a second SL communication in the following slot is less than a configured COT maintenance threshold.

Aspects of the present disclosure can provide several benefits. For example, by allowing multiple mechanisms for closing gap periods associated with PSFCH resources, one or more UEs communicating in a sidelink network may utilize greater portions of acquired COTs to make more efficient use of the shared frequency resources. Further, by facilitating more continuous sidelink communications in the shared frequency resources, the chance of collisions and/or interference may decrease. Thus, the error rate may also decrease, which can increase network speeds and reduce overhead, leading to an improved user experience. While the present disclosure is described in the context of deploying autonomous sidelink communication over a 2.4 GHz unlicensed band, the disclosed aspect can be applied to any suitable shared or unlicensed band.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, which may be shared by multiple network operating entities using various radio access technologies (RATs) such as NR-U, WiFi, and/or licensed-assisted access (LAA) as shown in FIG. 2.

Figure 2:
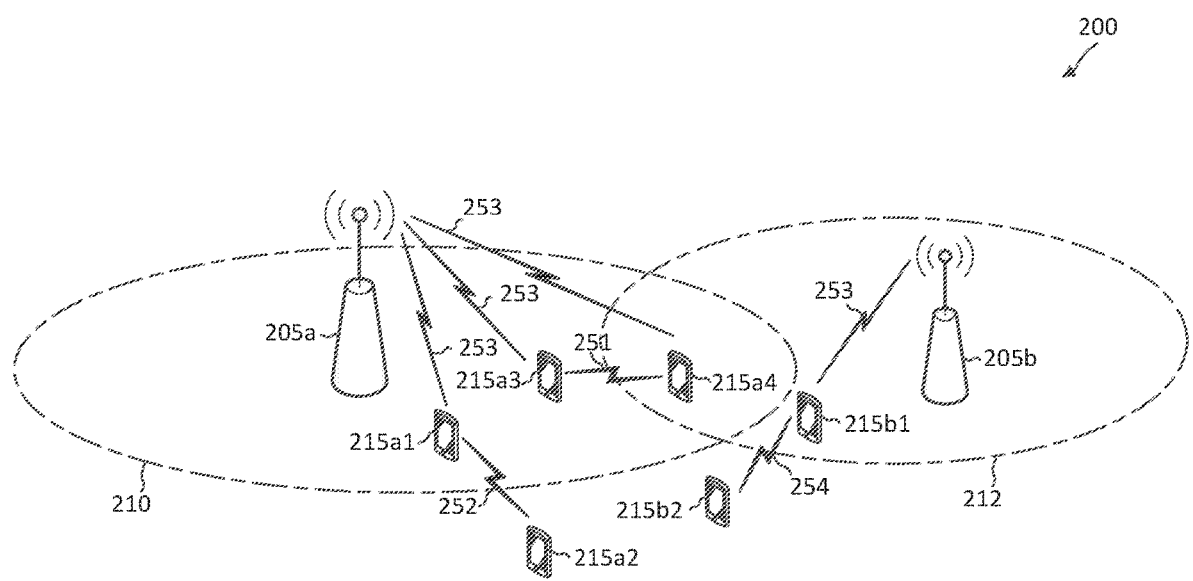
FIG. 2 illustrates a wireless communication network that provisions for sidelink communications according to some aspects of the present disclosure.

FIG. 2 illustrates an example of a wireless communication network 200 that provisions for sidelink communications according to aspect of the present disclosure. The network 200 may correspond to a portion of the network 100. FIG. 2 illustrates two BSs 205 (shown as 205a and 205b) and six UEs 215 (shown as 215a1, 215a2, 215a3, 215a4, 215b1, and 215b2) for purposes of simplicity of discussion, though it will be recognized that aspect of the present disclosure may scale to any suitable number of UEs 215 (e.g., the about 2, 3, 4, 5, 7 or more) and/or BSs 205 (e.g., the about 1, 3 or more). The BS 205 and the UEs 215 may be similar to the BSs 105 and the UEs 115, respectively. The BSs 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

The BS 205a and the UEs 215a1-215a4 may be operated by a first network operating entity. The BS 205b and the UEs 215b1-215b2 may be operated by a second network operating entity. In some aspects, the first network operating entity may utilize a same RAT as the second network operating entity. For instance, the BS 205a and the UEs 215a1-215a4 of the first network operating entity and the BS 205b and the UEs 215b1-215b2 of the second network operating entity are NR-U devices. In some other aspects, the first network operating entity may utilize a different RAT than the second network operating entity. For instance, the BS 205a and the UEs 215a1-215a4 of the first network operating entity may utilize NR-U technology while the BS 205b and the UEs 215b1-215b2 of the second network operating entity may utilize WiFi or LAA technology.

In the network 200, some of the UEs 215a1-215a4 may communicate with each other in peer-to-peer communications. For example, the UE 215a1 may communicate with the UE 215a2 over a sidelink 252, the UE 215a3 may communicate with the UE 215a4 over another sidelink 251, and the UE 215b1 may communicate with the UE 215b2 over yet another sidelink 254. The sidelinks 251, 252, and 254 are unicast bidirectional links. Some of the UEs 215 may also communicate with the BS 205a or the BS 205b in a UL direction and/or a DL direction via communication links 253. For instance, the UE 215a1, 215a3, and 215a4 are within a coverage area 210 of the BS 205a, and thus may be in communication with the BS 205a. The UE 215a2 is outside the coverage area 210, and thus may not be in direct communication with the BS 205a. In some instances, the UE 215a1 may operate as a relay for the UE 215a2 to reach the BS 205a. Similarly, the UE 215b1 is within a coverage area 212 of the BS 205b, and thus may be in communication with the BS 205b and may operate as a relay for the UE 215b2 to reach the BS 205b. In some aspects, some of the UEs 215 are associated with vehicles (e.g., similar to the UEs 115i-k) and the communications over the sidelinks 251, 252, and 254 may be C-V2X communications. C-V2X communications may refer to communications between vehicles and any other wireless communication devices in a cellular network.

Figure 3:
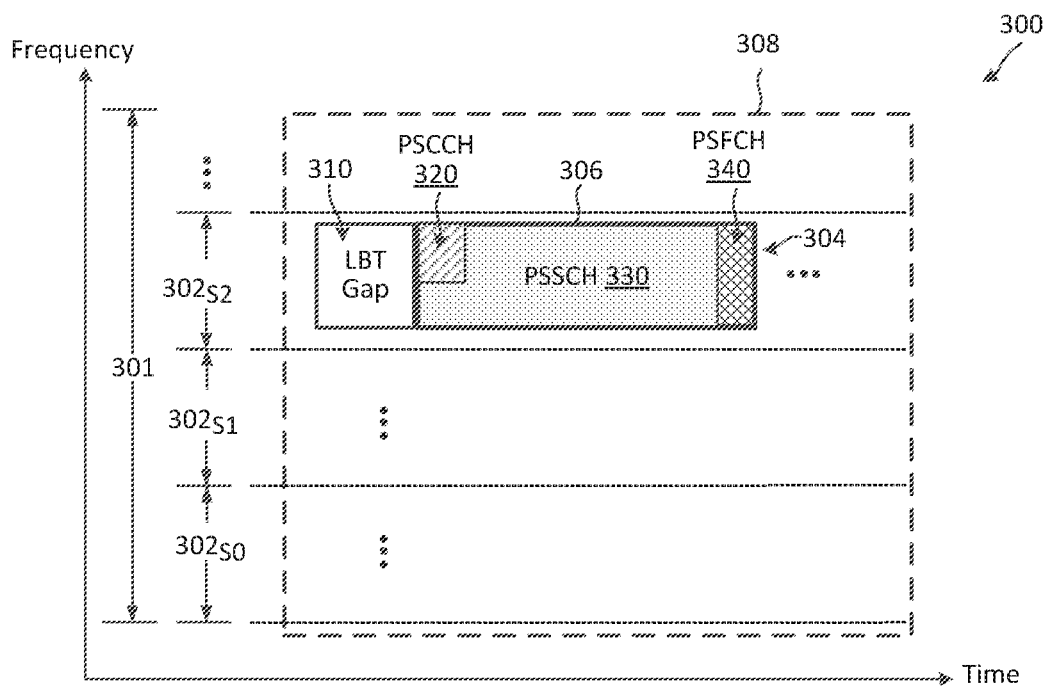
FIG. 3 illustrates a sidelink communication scheme in a wireless communication network according to some aspects of the present disclosure.

FIG. 3 illustrates a sidelink communication scheme 300 in a wireless communication network according to some aspects of the present disclosure. The scheme 300 may be employed by UEs such as the UEs 115 and/or 215 in a network such as the networks 100 and/or 200. In particular, sidelink UEs may employ the scheme 300 to contend for access in a shared radio frequency band (e.g., in a shared spectrum or an unlicensed spectrum) for sidelink communication. The shared radio frequency band may be shared by multiple RATs as discussed in FIG. 2. In FIG. 3, the x-axis represents time in some arbitrary units, and the y-axis represents frequency in some arbitrary units.

In scheme 300, a shared radio frequency band 301 is partitioned into a plurality of subchannels or frequency subbands 302 (shown as $302_{S0}$, $302_{S1}$, $302_{S2}$, . . . ) for sidelink communication. The frequency band 301 may be at any suitable frequencies. In some instances, the frequency band 301 is a 2.4 GHz unlicensed band. In some instances, the frequency band 301 is a 5 GHz unlicensed band. In some instances, the frequency band 301 is a 6 GHz unlicensed band. The frequency band 301 may have any suitable BW and may be partitioned into any suitable number of frequency subbands 302. The number of frequency subbands 302 can be dependent on the sidelink communication BW requirement. In some aspects, the frequency band 301 is a 2.4 GHz unlicensed band and may have a bandwidth of about 80 megahertz (MHz) partitioned into about fifteen 5 MHz frequency subbands 302.

A sidelink UE (e.g., the UEs 115 and/or 215) may be equipped with a wideband receiver and a narrowband transmitter. For instance, the UE may utilize the narrowband transmitter to access a frequency subband $302_{S2}$ for sidelink transmission utilizing a frame structure 304. The frame structure 304 is repeated in each frequency subband 302. In some instances, there can be a frequency gap or guard band between adjacent frequency subbands 302 as shown in FIG. 3, for example, to mitigate adjacent band interference. Thus, multiple sidelink data may be communicated simultaneously in different frequency subbands 302 (e.g., FDM). The frame structure 304 is also repeated in time. For instance, the frequency subband $302_{S2}$ may be time-partitioned into a plurality of frames with the frame structure 304. The frame structure 304 includes an LBT gap duration 310 followed by a sidelink resource 306. The LBT gap duration 310 is used for channel contention among devices of the same RAT or among devices of different RATs. Upon winning contention, the sidelink UE may utilize the sidelink resource 306 for transmission of control and user data.

The sidelink resource 306 may have a substantially similar structure as an NR sidelink resource. For instance, the sidelink resource 306 may include a number of subcarriers or RBs in frequency and a number of symbols in time. In some instances, the sidelink resource 306 may have a duration between about one millisecond (ms) to about 20 ms. The sidelink resource 306 may include a PSCCH 320, a PSSCH 330, and/or a physical sidelink feedback channel (PSFCH) 340. The PSCCH 320, the PSSCH 330, and the PSFCH 340 can be multiplexed in time and/or frequency. In the illustrated example of FIG. 3, the PSCCH 320 is located during the beginning symbol(s) (e.g., about 1 symbol or about 2 symbols) of the sidelink resource 306 and occupies a portion of the frequency subband $302_{S2}$. The PSFCH 340 is located at the ending symbol(s) of the sidelink resource 306. The PSSCH 330 occupies the remaining time-frequency resources in the sidelink resource 306. In general, the PSCCH 320, the PSSCH 330, and the PSFCH 340 may be multiplexed in any suitable configuration within the sidelink resource 306.

A sidelink UE (e.g., the UEs 115 and/or 215) intending to transmit in the frequency band 301 may perform a narrowband LBT in one or more frequency subbands 302. As an example, the sidelink UE may perform an LBT in the frequency subbands $302_{S2}$ during the LBT gap duration 310. The LBT may be an energy detection-based CAT4 LBT as discussed above with reference to FIG. 1. If the LBT is a pass (e.g., when the measured channel signal energy is below an energy detection threshold), the sidelink UE may proceed to transmit SCI and sidelink data to a peer sidelink UE in the sidelink resource 306. If the LBT fails (e.g., when the channel signal energy is above the energy detection threshold), the sidelink UE may refrain from transmitting in the sidelink resource 306. As such, the LBT can operate to gate access or occupancy in a frequency subband $302_{S2}$ and to facilitate coexistence with other technologies sharing the frequency band 301.

The sidelink UE may transmit the SCI in the PSCCH 320 and the sidelink data (e.g., user information data) in the PSSCH 330. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The sidelink UE may also transmit a HARQ ACK/NACK in the PSFCH 340. The HARQ ACK/NACK may be a feedback for sidelink data received by the sidelink UE in an earlier sidelink resource 306. The SCI can indicate a reservation for a next sidelink resource 306. Thus, an intra-NR sidelink UE (e.g., a UE in the same NR-U sidelink system) may perform SCI sensing to determine whether a sidelink resource 306 is available or occupied for intra-NR sharing. For instance, if the intra-NR sidelink UE detected SCI indicating a reservation for the sidelink resource 306, the intra-NR sidelink UE may refrain from transmitting in the reserved sidelink resource 306. If the intra-NR sidelink UE determines that there is no reservation detected for a sidelink resource 306, the intra-NR sidelink UE may transmit in the sidelink resource 306. As such, SCI sensing can assist a UE in identifying a target frequency subband 302 to reserve for sidelink communication and to avoid collision (e.g., intra-NR collision) with another sidelink UE in the NR sidelink system. In some aspects, the intra-RAT sidelink UE may be configured with a sensing window for SCI sensing or monitoring to reduce intra-NR collision.

The SCI can also indicate scheduling information and/or a destination identifier (ID) identifying a target receiving sidelink UE for the next sidelink resource 306. Thus, a sidelink UE may monitor SCIs transmitted by other sideling UEs. Upon detecting SCI in a sidelink resource 306, the sidelink UE may determine whether the sidelink UE is the target receiver based on the destination ID. If the sidelink UE is the target receiver, the sidelink UE may proceed to receive and decode the sidelink data indicated by the SCI.

In some aspects, the scheme 300 is used for synchronous sidelink communication. In other words, the sidelink UEs are synchronized in time and are aligned in terms of symbol boundary, sidelink resource boundary (e.g., the starting time of sidelink resource 306), LBT gap duration boundary (e.g., the starting time of the LBT gap duration 310). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, a sidelink UE in the system may be preconfigured with a resource pool 308 in the frequency band 301, for example, while in a coverage of a serving BS. The resource pool 308 may include a plurality of sidelink resources 306 arranged as shown in the frame structure 304. The BS can configure the sidelink UE with a resource pool configuration indicating resources in the frequency band 301 and/or the subbands 302, the frame structure 304 (e.g., the LBT gap duration 310 and/or the sidelink resource 306), and/or timing information (e.g., LBT gap duration 310 start and end boundaries).

Figure 4:
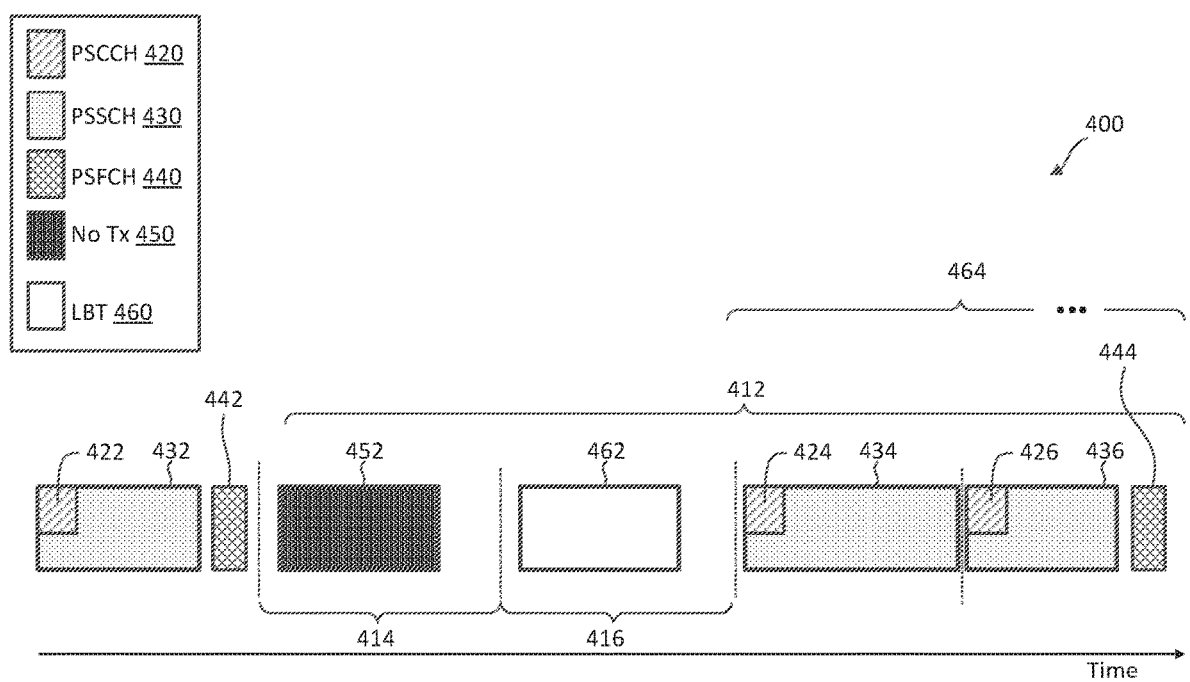
FIG. 4 is a timing diagram illustrating a sidelink communication scenario, according to some aspects of the present disclosure.

FIG. 4 illustrates a sidelink communication scenario 400 in a shared frequency band, according to aspects of the present disclosure. The scenario 400 may involve UEs such as the UEs 115 and/or 215 in a network such as the networks 100 and/or 200. In particular, sidelink UEs may communicate and/or operate according to the scenario 400 to contend for access in a shared radio frequency band (e.g., in a shared spectrum or an unlicensed spectrum) for sidelink communication. The shared radio frequency band may be shared by multiple RATs as discussed in FIG. 2. In FIG. 4, the x-axis represents time in some arbitrary units, and the y-axis represents frequency in some arbitrary units.

In the scenario 400, a UE may communicate using a plurality of sidelink resources, as similarly discussed above with respect to the scheme 300. The sidelink resources may include PSCCHs 420, PSSCHs 430, and PSFCHs 440. The scenario 400 includes sidelink communications in the shared frequency band over a period of time including a plurality of slots (e.g., 414, 416). The time domain configuration of the scenario 400 may include periodic and/or semi-persistent PSFCH resources 440 including PSFCH instances 442, 444. The PSFCH resources 440 may be a global or common configuration for a plurality of UEs communicating in a cell and/or network, in some aspects. The PSFCH resources 440 may be used to transmit SL feedback information and/or to receive SL feedback information. In some aspects, SL feedback information may include hybrid automatic repeat request (HARQ) acknowledgement/non-acknowledgement (ACK/NACK) for one or more PSSCH instances, such as the first PSSCH 432 and/or the second PSSCH 434. The periodicity of the PSFCH resources 440 may be referred to as a PSFCH period 412. The PSFCH period 412 may me one or more slots, such as 1, 2, 4, 6, 8 and/or any other suitable number of slots. In the illustrated example, the PSFCH period 412 is four slots. In some aspects, a UE may determine whether there is SL feedback information to receive in a PSFCH resource, or whether there is SL feedback information to transmit in a PSFCH resource.

The sidelink resources may be associated with or acquired by a LBT 460. For example, the UE may perform a LBT to acquire a channel occupancy time (COT). If the LBT results in a pass, the UE acquires a COT during which the UE communicates in the first PSCCH 422 and the first PSSCH 432. Following the first PSSCH 432, the UE may be configured with a periodic and/or semi-persistent PSFCH resource or instance 442. In some aspects, the PSFCH instance 442 may result in a link switch and/or a gap in communications during the first COT. In some aspects, the gap in communications may exceed the configured COT maintenance threshold described above. Accordingly, the UE may refrain from transmitting and/or receiving during the following slot 414. The UE may then perform a second LBT 462 during a second slot 416. Based on the second LBT 462, the UE may acquire a COT 464 during which the UE may communicate in a second PSCCH 424, a second PSSCH 434, a third PSCCH 426, and a third PSSCH 436. The UE may continue the COT 464, without performing an additional LBT, between the PSSCH 434 and the PSSCH 436 if the gap between the PSSCH 434 and the PSSCH 436 is equal to or lower than the configured COT maintenance threshold. For example, the UE may continue to communicate during the COT 464 if the gap between sidelink communications is less than 25 μs. In another example, the UE may continue to communicate during the COT 464 if the gap between sidelink communications is equal to or less than 16 μs.

The PSFCH resources 440 include a second PSFCH instance 444 following the third PSSCH 436. In some aspects, there may be a gap between the third PSSCH 436 and the second PSFCH instance 444. In some aspects, the gap may be greater than 16 μs, or greater than 25 μs. If the gap exceeds 25 μs, the UE may be indicated or configured to perform an additional LBT to continue communicating during the COT 464. In another aspect, the UE may perform an additional LBT to acquire or initiate a new COT before sidelink communications can resume. Further, in some aspects, the UE may not have PSFCH communications to transmit or to receive. However, the additional LBT would result in undesirable overhead and decreased throughput. Accordingly, the efficiency of the sidelink communications in the shared frequency band may decrease.

The present disclosure provides systems, schemes, and mechanisms for maintaining COTs over PSFCH instances in sidelink shared frequency communications. In some aspects, mechanisms for maintaining COT's include a first wireless communication device indicating a second wireless communication device to transmit a signal in at least one Symbol between a sidelink communication channel and a sidelink feedback instance. In some aspects, the sidelink feedback instance may be a PSFCH instance. In some aspects, the signal may include a cyclic prefix (CP). In some aspects, the CP may be referred to as a CP extension (CPE). In some aspects, transmitting the signal may include transmitting sidelink ACK/NACK in a PSFCH instance with a CPE extending at least partially within the at least one gap symbol. The second wireless communication device may transmit the signal in the at least one gap symbol such that a remaining gap between a PSSCH and a PSFCH communication is less than 25 μs. In another aspect, the second wireless communication device may transmit the signal such that the gap between the PSSCH and the PSFCH is less than about 16 μs. According to another aspect of the present disclosure, the first wireless communication device may indicate the second wireless communication device to transmit a filler signal or pattern signal in the at least one PSF see instance. For example, in some instances, the first wireless communication device may not expect to receive PSFCH communications from the second wireless communication device. Further, the first wireless communication device may not have sidelink feedback data to communicate in the PSFCH instance. Accordingly, the first wireless communication device may indicate the second wireless communication device to transmit the padding signal, where the padding signal is based on a PSFCH waveform. In some aspects, transmitting the padding signal may include transmitting a CPE with the PSFCH-based padding signal. In some aspects, the CPE may be transmitted in at least one gap symbol between the PSSCH and the PSFCH instance. According to another aspect of the present disclosure, a mechanism for maintaining a COT may include rate matching sidelink data to extend over the at least one gap symbol and/or the PSFCH instance.

Figure 5:
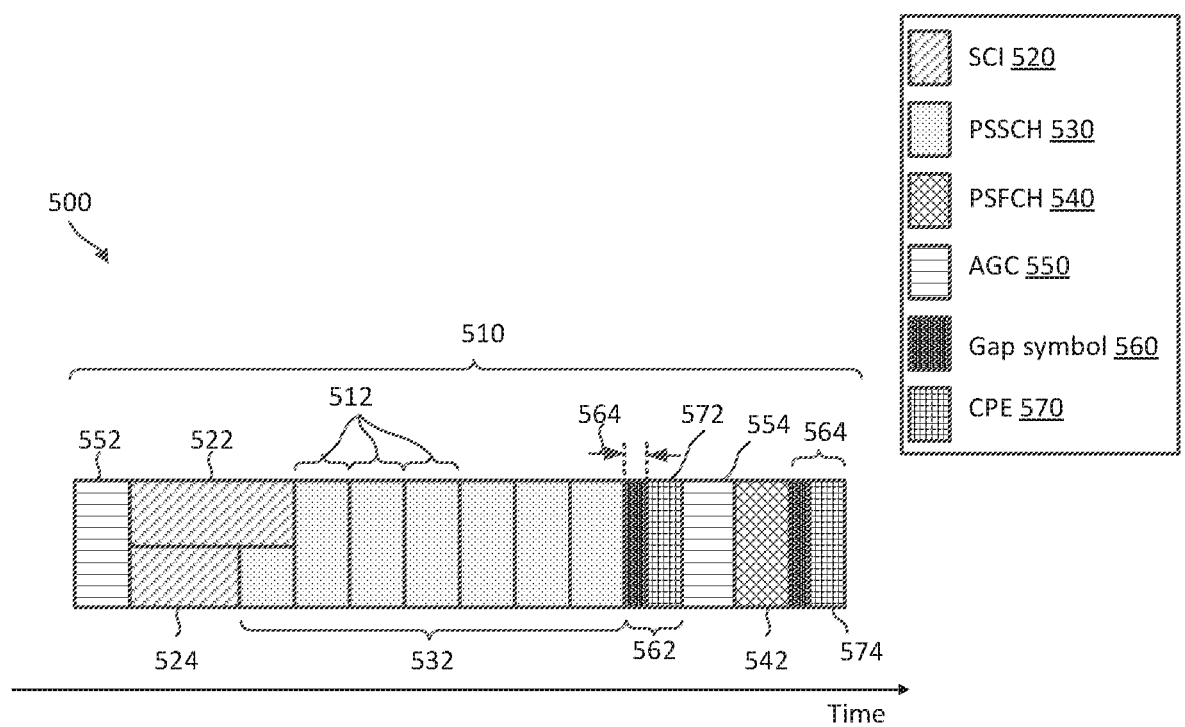
FIG. 5 is a timing diagram illustrating a scheme for maintaining a channel occupancy time (COT) for sidelink communications in a shared frequency band, according to aspects of the present disclosure.

FIG. 5 is a diagram illustrating a COT maintenance scheme 500 for sidelink communications in a shared frequency band. Aspects of the present disclosure may be performed by a first wireless communication device and/or a second wireless communication device. For example, in one aspect, one or more actions of the scheme 500 may be performed by a first user equipment communicating with a second user equipment. FIG. 5 shows a plurality of sidelink resources configured for sidelink communications between the first wireless communication device and the second wireless communication device the sidelink resources are distributed over a slot 510 the slot 510 includes a plurality of symbols 512. As similarly illustrated in FIG. 4, the slot 510 may be a portion of a COT obtained by performing a LBT in the shared frequency band. The communications within the slot 510 include sidelink control information (SCI) 520, PSSCH data 530, PSFCH data 540, automatic gain control symbols (AGC) 550, and gap symbols 560. For instance, the first symbol of the slot 510 includes a first AGC 552. The first AGC 552 may include or be based on a copy of the signals, waveforms, and/or data in the immediately following symbol. The SCI 520 communicated during the slot 510 includes a first SCI 522 and a second SCI 524. In some aspects, the first SCI 522 includes SCI-1. In another aspect, the second SCI 524 includes SCI-2. In some aspects, the first SCI 522 is communicated using PSCCH resources, and the second SCI 524 is communicated using PSSCH resources. The slot also includes a PSSCH communication 532. The PSSCH communication 532 may include SL data, RRC information elements (IEs), media access control (MAC) IEs and/or control elements (CEs). The SL data may be communicated in one or more transport blocks (TBs).

In some aspects, the resources for each of the SL communications may be configured for a SL resource pool. In some aspects, the SL resource pool may indicate time and/or frequency resources for each of a plurality of channels, such as the PSCCH, the PSSCH, and the PSFCH. In some aspects, the allocation of frequency resources may include one or more sets of resource blocks (RBs), one or more interlaces of RBs, one or more subchannels, and/or one or more partial RBs. In some aspects, the frequency resources may be different for different channels. For example, the SL resource pool may indicate a first subset of frequency resources for the SCI 520, a second subset of frequency resources for the PSSCH communications 530, and a third subset of frequency resources for the PSFCH communications 540. In some aspects, the SL resource pool may include or indicate a first interlace of RBs for the PSSCH communications 530, and a second interlace of RBs for the PSFCH communications 540. Further, the UEs may be configured with a mapping scheme or configuration for mapping PSSCH resources to the PSFCH resources. For example, the PSFCH resources may be divided into subsets or portions, where each subset is allocated for a PSSCH communication 530 in a given PSSCH resource and/or slot.

For PSFCH communications, a UE may be configured with a dynamic HARQ timeline, or a fixed HARQ timeline. For a dynamic HARQ timeline, the SCI in each slot may include a value of K1 indicating which PSFCH instance carries the SL feedback information for the associated PSSCH in a later slot. For example, a K1 value of 5 may indicate that the SL feedback information (e.g., ACK, NACK) for the associated PSSCH communication may be provided in a PSFCH resource 5 slots in the future. For a fixed HARQ timeline, a UE may be configured with a MinTimeGapPSFCH value, which indicates a minimum number of slots after the last slot of a PSSCH communication before the UE transmits the PSFCH.

The slot 510 includes a PSFCH instance 542. For example, the UEs may be configured with a periodic PSFCH resource that occurs once every n slots. In some aspects, n may be 1, 2, 3, 4, 5, 6, 8, and/or any other suitable number of slots. In some aspects, the value of n may be referred to as the PSFCH period, as explained above. Between the PSSCH communication 532 and the PSFCH resource 542 there is at least one gap symbol 562 and a AGC symbol 554. In some aspects, the duration of the gap symbol 562 may be greater than a configured threshold for COT maintenance. For example, the duration of the symbol 562 may be greater than 25 μs, and/or greater than 16 μs. In the scheme 500, the first wireless communication device indicates the second wireless communication device to transmit, with the PSFCH communication 542, a signal in at least a portion of the gap symbol 562. In the example shown in FIG. 5, the first wireless communication device indicates the second wireless communication device to add a CP extension (CPE) 572 to the AGC 554 to within at least a portion of the gap symbol 562. The communication of the CPE 572 reduces the duration of the gap 564 between the PSSCH 532 and the PSFCH instance 542. In some aspects, the communication of the CPE 572 may reduce the duration of the gap 564 to lower than the configured COT maintenance threshold. For example, the second wireless communication device may communicate the CPE 572 such that the duration of the gap 564 is less than 25 μs and/or less than 16 μs. Thus, the first wireless communication device may continue to communicate using the COT in the following slot.

In some instances, the PSFCH communication in the PSFCH instance 542 may include a SL ACK/NACK transmitted by the second wireless communication device to acknowledge reception or no reception of one or more PSSCH communications transmitted by the first wireless communication device. For example, in some aspects, the PSFCH communication may indicate SL ACK/NACK for one or more PSSCH instances preceding the PSFCH resource. In some aspects, the PSFCH communication in the PSFCH instance 542 may indicate ACK/NACK for each PSSCH communication in a PSFCH period. In some aspects, the PSFCH communication in the PSFCH instance 542 may indicate ACK/NACK for PSSCH communications over a plurality of PSFCH periods. In another aspect, the PSFCH communication in the PSFCH instance 542 may indicate ACK/NACK or other SL feedback information associated with the SCI 520. For example, the first wireless communication device may indicate the second wireless communication device to transmit SL feedback information based on decoding at least one of the first SCI 522 or the second SCI 524. Thus, if the second wireless communication device does not have PSFCH information to transmit in the PSFCH instance 542, the second wireless communication device may transmit the SL feedback information in the PSFCH instance 542 based on decoding the SCI 522, 524.

In another aspect, transmitting the PSFCH communication in the instance 542 may include transmitting a filler signal or padding signal in the PSFCH instance 542. For example, if the first wireless communication device does not expect to receive SL feedback information in the PSFCH instance 542, the first wireless communication device may indicate the second wireless communication device to transmit the padding signal in the instance 542. The padding signal may be based on a PSFCH waveform. Accordingly, the second wireless communication device may transmit the PSFCH-based padding signal with the AGC 554 and the CPE 572 such that the padding signal, AGC 554, and CPE 572 at least partially close or fill the gap 564 in communications between the PSFCH instance 542 and the PSSCH 532. Accordingly, the COT is maintained such that the first wireless communication device may resume communications in a second slot following the PSFCH instance 542. In some aspects, the first wireless communication device resuming communications in the following slot may include an additional CPE 574 in at least a portion of a second gap symbol 564 following the PSFCH instance 542. Accordingly, the combination of the second wireless communication device's closing the first gap symbol 562 and the first wireless communication device closing the second gap symbol 564 may maintain the COT for additional PSSCH communications after the PSFCH instance 542.

Figure 6:
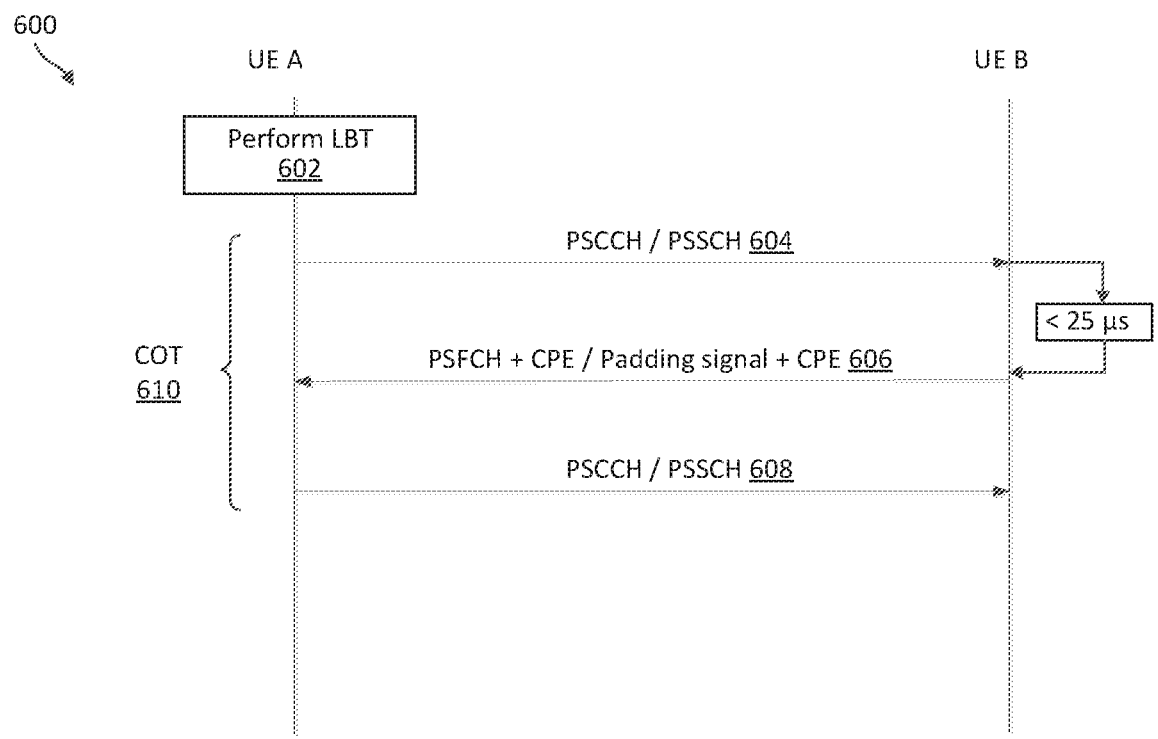
FIG. 6 is a signaling diagram illustrating a method for maintaining a COT for sidelink communications in a shared frequency band, according to aspects of the present disclosure.

FIG. 6 is a signaling diagram of a method 600 for wireless communication performed by a first UE (UE A) and a second UE (UE B). The UEs may be UEs 115 in the network 100 and/or UEs 215 in the network 200. The method 600 may include aspects of the scheme 500 shown in FIG. 5. The method 600 may include the UEs A and B communicating via a sidelink interface in a shared frequency band. For example, the method 600 may include communicating using a sidelink-unlicensed (SL-U) protocol. In some aspects, the UEs A and B may communicate using a PC5 interface. As mentioned above, to communicate in shared or unlicensed frequency resources, one or both of the UEs A and B may perform a clear channel assessment (CCA), such as a listen-before-talk (LBT) to acquire a set of time resources in a frequency band or subband. The time resources may be referred to as a channel occupancy time (COT).

At action 602, UE A performs an LBT to initiate or acquire a COT 610. In some aspects, the LBT may be a CAT4 LBT with a random backoff period. In other aspects, the LBT may be a CAT2 LBT. Performing the LBT may include obtaining signal measurements for a configured period of time. In some aspects, the period of time may be variable. For example, the period of time may include a random backoff period associated with a random backoff counter value. In another aspect, the period of time may be fixed. Based on the LBT, UE A initiates the COT 610. The COT 610 may include a time period during which UE A may communicate with one or more UEs in the network, including UE B. In some aspects, the time period may be configured as a value of absolute time units, such as ms or µs. In another aspect, the time period may be configured as a value of frames, subframes, and/or slots.

At action 604, UE A transmits, to UE B, a SL communication including a PSCCH communication and a PSSCH communication. In some aspects, the PSCCH communication may include SCI. The SCI may be SCI-1 and/or SCI-2. In some aspects, the SCI may include an indication to UE B to transmit a signal to UE A during at least one gap symbol preceding a PSFCH resource. In other words, the SCI may indicate UE B to transmit the signal in the at least one gap symbol, where the at least one gap symbol is between the PSSCH communication and the PSFCH resource. The PSFCH resource may be a periodic and/or semi-persistent PSFCH resource scheduled for a period of time following the PSSCH communication. The PSFCH resource may be during the COT such that additional PSCCH and/or PSSCH resources may be used after the PSFCH resource if the COT is maintained.

In some aspects, action 604 includes UE A indicating UE B to transmit a CPE with a PSFCH communication, with the CPE transmitted during the at least one gap symbol. The CPE may include an extension of an AGC symbol transmitted with ACK/NACK information associated with the PSSCH communication and/or one or more previous PSSCH communications. In another aspect, action 604 includes UE A indicating UE B to transmit a PSFCH-based padding signal with CPE to extend within the at least one gap symbol. For example, UE A may indicate UE B to transmit the PSFCH-based padding signal based on UE A determining that no ACK/NACK information is expected from UE B in the PSFCH instance. In some aspects, action 604 includes UE A indicating UE B to transmit the PSFCH-based padding signal in each of one or more PSFCH instances before n+K1. For example, the SCI transmitted at action 604 may include an indication of the value for n in addition to the indication to transmit the PSFCH-based padding signal with CPE. In other examples, UE A may indicate UE B to transmit the PSFCH-based padding signal only in the next PSFCH instance.

In another aspect, action 604 may include UE A or UE B selecting a PSFCH frequency resource, or subset of frequency resources, to transmit the PSFCH-based padding signal. For example, UE A or UE B may select a set of frequency resources for the PSFCH-based padding signal that are orthogonal to the resources used by other potential Tx-Rx pairs. In one example, UE A or UE B may select a set of frequency resources for the PSFCH-based padding signal based on the COT-initiating UE's (UE A) identifier. For example, UE A or UE B may select the set of frequency resources based on its own L1 identifier. In this regard, UE A or UE B may select a PSFCH resource block (RB) group, RB-set, and/or RB interlace based on UE A's ID. According to another aspect, UE A or UE B may be configured with a reserved PSFCH resource for transmitting the PSFCH-based padding signal. For example, UE A and/or UE B may be configured with a reserved cyclic shift (CS), RB group, and/or RB interlace for transmitting the PSFCH-based padding signal. In another aspect, UE B may randomly select a PSFCH RB group and/or RB interlace. In some aspects, the reserved frequency resources for the PSFCH transmission by UE B may be excluded from the PSFCH resource pool. In some aspects, the other UEs in the network transmitting SL feedback information (e.g., ACK/NACK) in the PSFCH instance with the PSFCH-based padding signal may all select ACK to transmit in the PSFCH instance. In another example, the other UEs transmitting SL feedback information in the PSFCH instance may all select NACK to transmit in the PSFCH instance.

In another aspect, action 604 includes UE A indicating UE B to transmit ACK/NACK with CPE, where the ACK/NACK is associated with the PSCCH transmitted at action 604. For example, UE A may determine whether it expects PSFCH information from UE B and transmit, based on the indication, SCI in the PSCCH indicating UE B to transmit the PSFCH indicating ACK/NACK for the SCI. The SCI may indicate UE B to transmit the CPE along with the PSFCH.

At action 606, UE B transmits, and UE A receives, based on the indication of action 604, at least one of: (1) a PSFCH with CPE, or (2) a PSFCH-based padding signal with CPE. In some aspects, the CPE is transmitted within at least a portion of a gap symbol between the PSSCH transmitted at action 604 and the PSFCH resource. For example, the CPE may be transmitted to cover a portion of a gap symbol between a final PSSCH symbol and the AGC symbol preceding the PSFCH symbol. For example, the transmission of the PSFCH and CPE/padding signal and CPE may be transmitted such that the gap between the PSCCH/PSSCH in action 604 and the communication of action 606 is less than 25 s. In another example, the gap may be less than 16 µs. In some aspects, action 606 includes transmitting ACK/NACK for the PSCCH transmitted at action 604. In another aspect, action 606 includes transmitting ACK/NACK for one or more previous PSSCH communications.

At action 608, UE A transmits, and UE B receives, a second SL communication including a second PSCCH and a second PSSCH. As illustrated in FIG. 6, actions 604, 606, and 608, and their associated communications, are performed within the COT 610. Accordingly, based on the indication transmitted at action 604 and the transmission by UE B at action 606, the COT 610 is maintained such that a new LBT may not be performed. Thus, the remainder of the COT 610 may be used following the PSFCH instance by at least partially closing the link switch gap associated with the PSFCH instance. In some aspects, action 608 may include UE A transmitting a CPE in a gap symbol preceding the first PSCCH/PSSCH symbol after the PSFCH instance.

Figure 7:
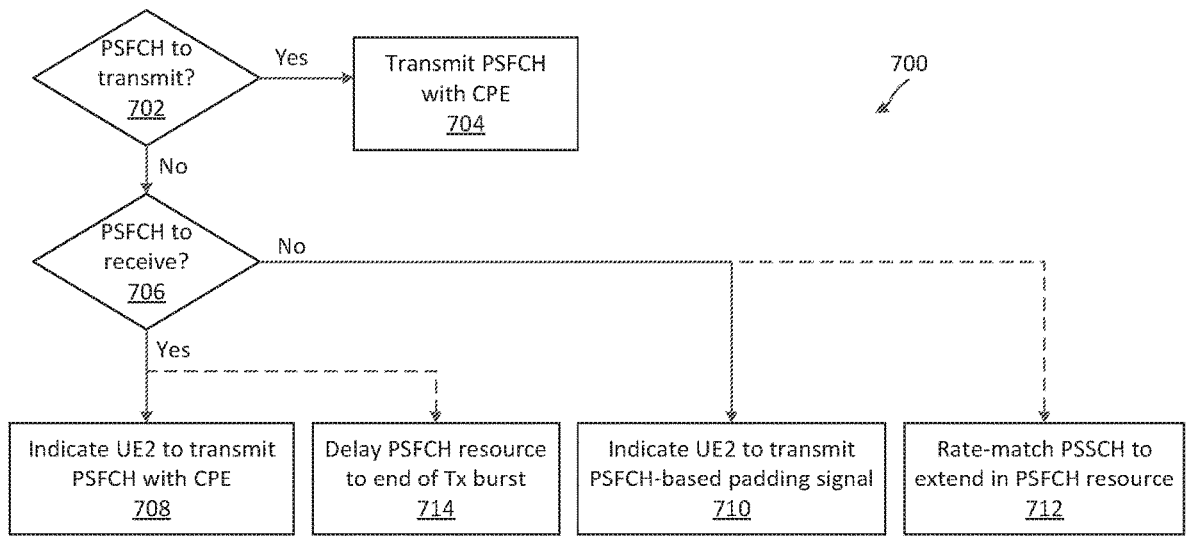
FIG. 7 is a flow diagram illustrating a scheme for maintaining a COT for sidelink communications in a shared frequency band, according to aspects of the present disclosure.

FIG. 7 is a flow diagram illustrating a scheme 700 for COT maintenance for sidelink communications in a shared frequency band, according to aspects of the present disclosure. As will be understood, the scheme 700 may include aspects of the schemes 500 and/or 600. For example, the scheme 700 may be performed by a first wireless communication device communicating with a second wireless communication device using a sidelink communication protocol. In some aspects, the scheme 700 may provide a decision architecture or protocol for selecting a COT maintenance mechanism. Aspects of the scheme 700 may be performed by a UE such as one of the UEs 115, 215. The scheme 700 may involve or be associated with a UE configuration. The UE configuration may include a set of rules or a hard coded protocol for maintaining a COT through a PSFCH resource.

At action 702, the UE determines whether the UE has SL feedback information to transmit in a PSFCH resource. In some aspects, the PSFCH resource may be in the middle of a SL TB burst. Accordingly, there may be additional time resources following the PSFCH resource that the UE may use for additional SL communications. Determining whether the UE has SL feedback to transmit may include determining whether the UE has received PSSCH in one or more slots during a PSFCH period associated with the PSFCH resource. If the UE determines that there is PSFCH to transmit, the UE may transmit, at action 704, the PSFCH (e.g., ACK/NACK) in the PSFCH resource with a CPE at the beginning of the PSFCH. For example, the UE may transmit the PSFCH with CPE in at least one gap symbol preceding the PSFCH resource such that the remaining gap is equal to or lower than a configured threshold.

At action 706, the UE determines whether the UE expects to receive SL feedback information to receive from one or more other UEs in the PSFCH resource. Determining whether the UE has SL feedback information to receive may include determining whether the UE has transmitted, to one or more other UEs, PSSCH communications during the PSFCH period.

If the UE determines that there is SL feedback information to receive during the PSFCH instance, the UE may indicate, at action 708, the second UE transmitting the PSFCH to transmit the PSFCH with CPE within at least one gap symbol preceding the PSFCH resource, as explained above with respect to FIGS. 5 and 6. If the UE determines that there is no SL feedback information to receive in the PSFCH resource, the UE may perform at least one of actions 710 or 712. For example, in action 710, the UE indicates the second UE to transmit a PSFCH-based padding signal in the PSFCH resource with CPE. Alternatively to action 710, the UE may rate match a PSSCH communication preceding the PSFCH resource such that the PSSCH communication extends over the PSFCH resource and the intervening gap symbol. Aspects of action 712 are illustrated in FIGS. 8, 9A, and 9B below.

In another aspect, at action 714, if the UE expects to receive SL feedback information in the PSFCH instance, the UE may alternatively determine to delay a PSFCH resource and/or the associated link switch until an end of a transmission burst. In some aspects, the UE may determine to delay the PSFCH instance or the communication of PSFCH until a PSFCH instance near the end of a COT. For example, in a fixed HARQ timeline, the UE may delay the PSFCH instance by setting MinTimeGapPSFCH to have a lager value. In an dynamic HARQ timeline, the UE may set K1 values so that the SL feedback information is communicated at the end of a data burst.

Figure 8:
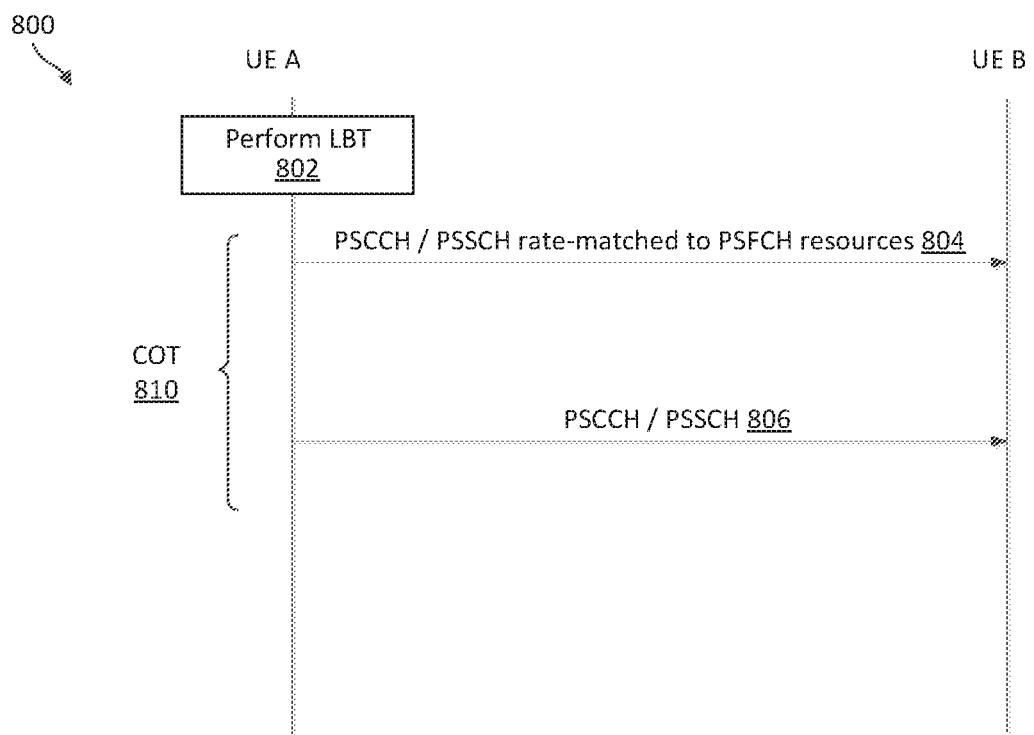
FIG. 8 is a signaling diagram illustrating a method for maintaining a COT for sidelink communications in a shared frequency band, according to aspects of the present disclosure.
Figure 9A:
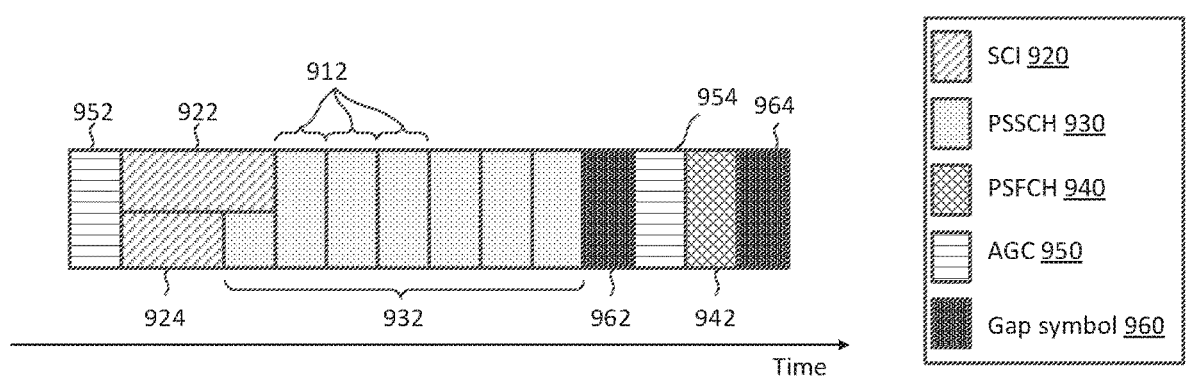
FIG. 9A is a timing diagram illustrating a sidelink communication scenario, according to some aspects of the present disclosure.
Figure 9B:
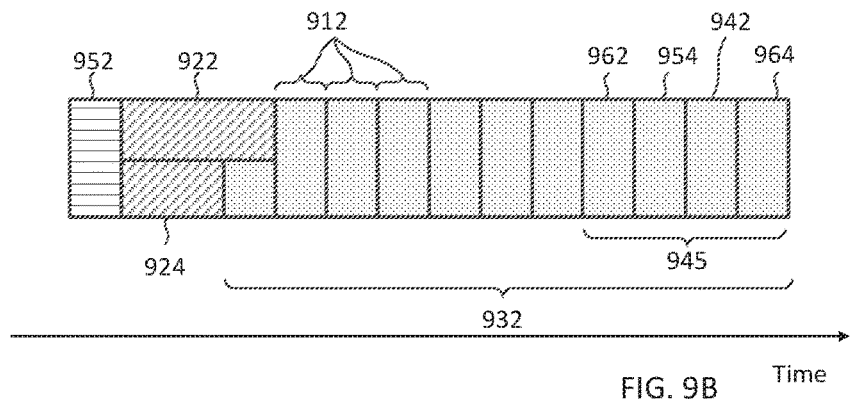
FIG. 9B is a timing diagram illustrating a scheme for maintaining a COT for sidelink communications in a shared frequency band, according to aspects of the present disclosure.

FIG. 8 is a signaling diagram of a method 800 for wireless communication performed by a first UE (UE A) and a second UE (UE B). The UEs A and/or B may be UEs 115 in the network 100 and/or UEs 215 in the network 200. The method 800 may include aspects of the schemes 500, 600, and/or 700 shown in FIGS. 5-7. In particular, FIG. 8 may illustrate aspects of action 712 of the scheme 700. The method 800 may include the UEs A and B communicating via a sidelink interface in a shared frequency band. For example, the method 800 may include communicating using a SL-U protocol. In some aspects, the UEs A and B may communicate using a PC5 interface. As mentioned above, to communicate in shared or unlicensed frequency resources, one or both of the UEs A and B may perform a clear channel assessment (CCA), such as a listen-before-talk (LBT) to acquire a set of time resources in a frequency band or subband. The time resources may be referred to as a channel occupancy time (COT).

At action 802, UE A performs an LBT to initiate or acquire a COT 610. In some aspects, the LBT may be a CAT4 LBT with a random backoff period. In other aspects, the LBT may be a CAT2 LBT. Performing the LBT may include obtaining signal measurements for a configured period of time. In some aspects, the period of time may be variable. For example, the period of time may include a random backoff period associated with a random backoff counter value. In another aspect, the period of time may be fixed. Based on the LBT, UE A initiates the COT 810. The COT 810 may include a time period during which UE A may communicate with one or more UEs in the network, including UE B. In some aspects, the time period may be configured as a value of absolute time units, such as ms or μs. In another aspect, the time period may be configured as a value of frames, subframes, and/or slots.

At action 804, UE A transmits, to UE B, a SL communication including a PSCCH communication and a PSSCH communication. In the method 800, UE A rate matches the PSSCH communication to extend through a PSFCH resource scheduled during the COT 810. In this regard, FIGS. 9A and 9B illustrate aspects of the PSSCH rate matching for COT maintenance. Referring to FIG. 9A, a SL slot is shown which may be similar, in some aspects, to the slot 510 shown in FIG. 5. In FIG. 9A, the communications within the slot include SCI 920, PSSCH data 930, PSFCH data 940, AGC symbols 950, and gap symbols 960. For instance, the first symbol of the slot includes a first AGC 952. The first AGC 952 may include or be based on a copy of the signals, waveforms, and/or data in the immediately following symbol. The SCI 920 communicated during the slot includes a first SCI 922 and a second SCI 924. In some aspects, the first SCI 922 includes SCI-1. In another aspect, the second SCI 924 includes SCI-2. In some aspects, the first SCI 922 is communicated using PSCCH resources, and the second SCI 924 is communicated using PSSCH resources. The slot also includes a PSSCH communication 932. The PSSCH communication 932 may include SL data, RRC information elements (IEs), media access control (MAC) IEs and/or control elements (CEs). The SL data may be communicated in one or more transport blocks (TBs). The slot includes a PSFCH instance 942, which may be referred to as a PSFCH symbol. The PSFCH instance 942 is preceded by the AGC symbol 954 and a gap symbol 962. The gap symbol 962 may be greater than a configured COT maintenance threshold. For example, the gap symbol 962 may have a duration longer than 16 μs and/or longer than 25 μs.

Referring to FIG. 9B, the UE may rate match the PSSCH communication 932 to include an extended PSSCH portion 945. The extended PSSCH portion 945 includes rate matched PSSCH data in symbols previously configured or allocated as a PSFCH symbol or instance 942, an AGC symbol 954, and gap symbols 962, 964. Referring again to FIG. 7, in some aspects, the UE may select action 712 instead of action 710 based on a configuration of the COT or UE configurations and/or capabilities with respect to COT sharing. For example, in some aspects, the second UE may not be configured to share the COT for transmitting SL feedback information. Accordingly, the UE may determine, based on UE configurations for COT sharing, to rate match the PSSCH instead of indicating the second UE to transmit a PSFCH with CPE and/or a PSFCH-based padding signal with CPE.

Returning to FIG. 8, at action 806, UE A transmits, and UE B receives, a second PSSCH and PSCCH communication in the COT 810. Accordingly, UE A may continue to communicate in the COT 810 without performing an additional LBT. In some aspects, the PSCCH transmitted at action 804 may include SCI indicating, to UE B, the rate matching behavior of UE A so that UE B can successfully receive and decode the PSSCH communication at action 806.

Figure 10:
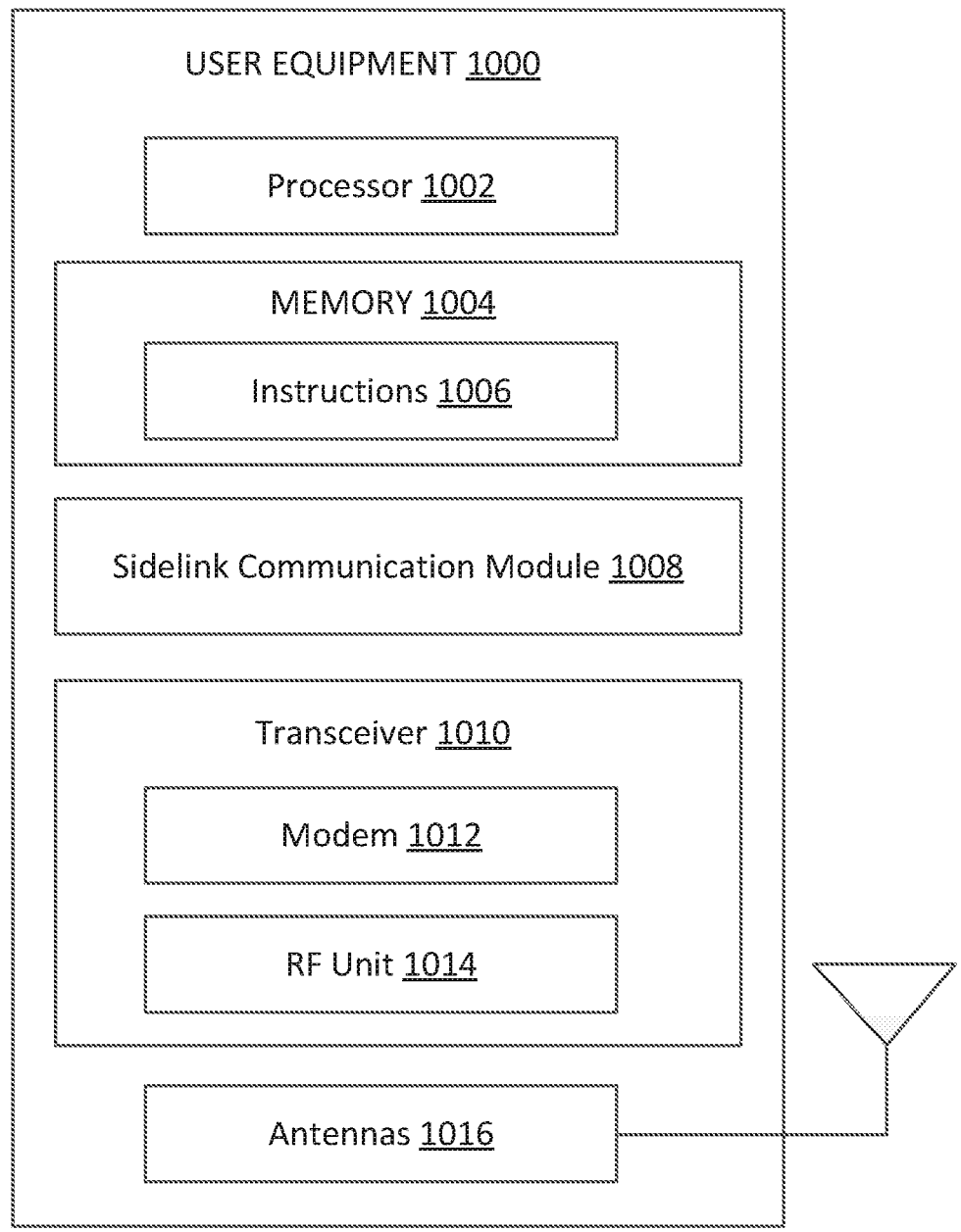
FIG. 10 is a block diagram of a user equipment (UE) according to some aspects of the present disclosure.

FIG. 10 is a block diagram of an exemplary UE 1000 according to some aspects of the present disclosure. The UE 1000 may be a UE 115 discussed above in FIG. 1 or a UE 215 discussed above in FIG. 2. As shown, the UE 1000 may include a processor 1002, a memory 1004, a sidelink communication module 1008, a transceiver 1010 including a modem subsystem 1012 and a radio frequency (RF) unit 1014, and one or more antennas 1016. These elements may be in direct or indirect communication with each other, for example via one or more buses.

The processor 1002 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1004 includes a non-transitory computer-readable medium. The memory 1004 may store, or have recorded thereon, instructions 1006. The instructions 1006 may include instructions that, when executed by the processor 1002, cause the processor 1002 to perform the operations described herein with reference to the UEs 115 in connection with aspects of the present disclosure, for example, aspects of FIGS. 5-9B. Instructions 1006 may also be referred to as program code. The program code may be for causing a wireless communication device to perform these operations, for example by causing one or more processors (such as processor 1002) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink communication module 1008 may be implemented via hardware, software, or combinations thereof. For example, the sidelink communication module 1008 may be implemented as a processor, circuit, and/or instructions 1006 stored in the memory 1004 and executed by the processor 1002. In some instances, the sidelink communication module 1008 can be integrated within the modem subsystem 1012. For example, the sidelink communication module 1008 can be implemented by a combination of software components (e.g., executed by a DSP or a general processor) and hardware components (e.g., logic gates and circuitry) within the modem subsystem 1012.

The sidelink communication module 1008 may be used for various aspects of the present disclosure, for example, aspects of FIGS. 5-9B. For instance, the sidelink communication module 1008 is configured to transmit, in a first portion of a channel occupancy time (COT) based on a listen-before-talk (LBT), a first sidelink (SL) communication comprising SL communication information (SCI). The SCI may indicate a second wireless communication device to transmit a signal in at least one gap symbol preceding a physical sidelink feedback channel (PSFCH). In some aspects, the sidelink communication module 1008 is configured to perform the LBT in a shared radio frequency band (e.g., the frequency band 301) within an LBT gap duration (e.g., the LBT gap duration 310). For example, the sidelink communication module 1008 may be configured to perform a CAT2 LBT, a CAT4 LBT, and/or any suitable type of LBT to initiate or acquire the COT. In some aspects, the sidelink communication module 1008 is configured to transmit the first SL communication may include transmitting SCI in a PSCCH and/or in a PSSCH. Further, the sidelink communication module 1008 may be configured to transmit SL data in a PSSCH. In some aspects, the communication may occur in one or more slots within the COT. The slot may include one or more symbols allocated for the PSFCH resource. For example, the slot may include, or be configured with, following the PSSCH resources, at least one first gap symbol, at least one AGC symbol, at least one PSFCH symbol, and at least a further gap symbol. In some aspects, the SCI indicates a second wireless communication device to transmit ACK/NACK in the PSFCH resource or instance and a cyclic prefix extension (CPE) in the first gap symbol preceding the PSFCH resource. In other aspects, the SCI indicates the second wireless communication device to transmit a PSFCH-based padding signal in the PSFCH resource with a CPE in the first gap symbol. In some aspects, the SCI indicates the second wireless communication device to transmit ACK/NACK for the SCI in the first SL communication.

In another aspect, the sidelink communication module 1008 may be configured to receive, from the second wireless communication device in the shared frequency band, the signal during the at least one gap symbol. As mentioned above, the sidelink communication module 1008 may receive a PSFCH with CPE. In some aspects, the PSFCH may indicate ACK/NACK for one or more PSSCH communications in one or more PSFCH periods associated with the PSFCH resource. In some aspects, the PSFCH may indicate ACK/NACK for the first SL communication. For example, the PSFCH may indicate ACK/NACK for SCI included in the first SL communication.

In another aspect, the sidelink communication module 1008 may be configured to transmit, in a second portion of the COT based on the LBT, a second SL communication. In some aspects, the second portion of the COT is subsequent to the PSFCH resource. For example, the first portion of the COT may be in a first slot within the COT, and the second portion of the COT may be in a second slot within the COT. In some aspects, the sidelink communication module 1008 may be configured to transmit a PSCCH and/or a PSSCH communication. In this regard, based on receiving the signal during the at least one gap symbol, the sidelink communication module 1008 may be configured to maintain the COT such that the first wireless communication device may resume communications within the COT after the PSFCH resource and without performing an additional LBT.

According to another aspect of the present disclosure, the sidelink communication module 1008 may be configured to perform a listen-before talk (LBT) in a shared radio frequency band to initiate a channel occupancy time (COT). For example, the sidelink communication module 1008 may be configured to a CAT2 LBT, a CAT4 LBT, and/or any suitable type of LBT to initiate or acquire the COT. Further, the sidelink communication module 1008 may be configured to transmit, based on the LBT, a first SL communication in the COT, where the first SL communication is rate matched to occupy at least a portion of SL feedback resources during the COT. For example, the sidelink communication module 1008 may be configured to transmit the first SL communication including SCI and SL data. The COT may include SL data resources and SL feedback resources. In some aspects, the SL feedback resources may include one or more PSFCH instances or symbols. In some aspects, transmitting the first SL communication may include transmitting SCI in a PSCCH and/or in a PSSCH. In a further aspect, the first SL communication may include a PSSCH communication. The sidelink communication module 1008 may be configured to rate match at least a portion of the PSSCH communication to occupy at least a portion of the SL data resources and the SL feedback resources. For example, the sidelink communication module 1008 may be configured to rate match the PSSCH communication to extend within at least one of a gap symbol, an AGC symbol, and/or a PSFCH symbol of the slot. Based on transmitting the rate matched first SL communication, the sidelink communication module 1008 may be configured to continue to perform SL communications in the COT in additional time resources. For example the sidelink communication module 1008 may be configured to communicate additional PSCCH and/or PSSCH communications in one or more slots in the COT following the SL feedback resources.

As shown, the transceiver 1010 may include the modem subsystem 1012 and the RF unit 1014. The transceiver 1010 can be configured to communicate bi-directionally with other devices, such as the BSs 105. The modem subsystem 1012 may be configured to modulate and/or encode the data from the memory 1004 and/or the sidelink communication module 1008 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 1014 may be configured to process (e.g., perform analog to digital conversion or digital to analog conversion, etc.) modulated/encoded data (e.g., SCI, sidelink data, LBT starting point reservations) from the modem subsystem 1012 (on outbound transmissions) or of transmissions originating from another source such as a UE 115 or a BS 105. The RF unit 1014 may be further configured to perform analog beamforming in conjunction with the digital beamforming. Although shown as integrated together in transceiver 1010, the modem subsystem 1012 and the RF unit 1014 may be separate devices that are coupled together at the UE 115 to enable the UE 115 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices. The antennas 1016 may provide the received data messages for processing and/or demodulation at the transceiver 1010. The transceiver 1010 may provide the demodulated and decoded data (e.g., sidelink configuration, resource pool configuration) to the sidelink communication module 1008 for processing. The antennas 1016 may include multiple antennas of similar or different designs in order to sustain multiple transmission links. The RF unit 1014 may configure the antennas 1016.

In some aspects, the transceiver 1010 is configured to perform an LBT in a shared radio frequency band based on a first starting point of a plurality of starting points within an LBT gap duration and transmit, to a second UE (e.g., the UEs 115, 215, and/or 1000), a first sidelink communication in the shared radio frequency band based on the LBT, the first sidelink communication including first SCI and first sidelink data, for example, by coordinating with the sidelink communication module 1008.

In an aspect, the UE 1000 can include multiple transceivers 1010 implementing different RATs (e.g., NR and LTE). In an aspect, the UE 1000 can include a single transceiver 1010 implementing multiple RATs (e.g., NR and LTE). In an aspect, the transceiver 1010 can include various components, where different combinations of components can implement different RATs.

Figure 11:
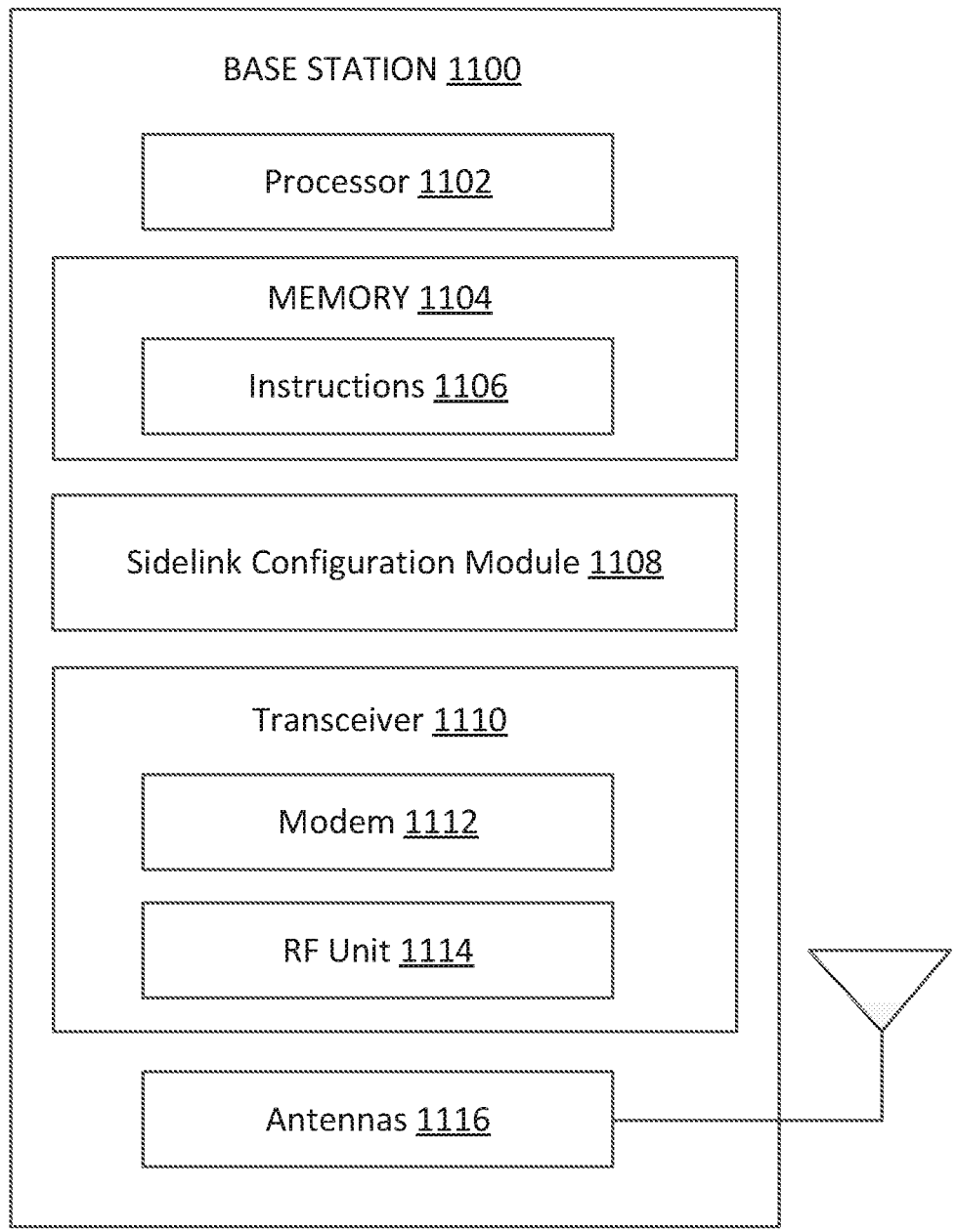
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 in the network 100 as discussed above in FIG. 1 or a BS 205 in the network 200 as discussed above in FIG. 2. As shown, the BS 1100 may include a processor 1102, a memory 1104, a sidelink configuration module 1108, a transceiver 1110 including a modem subsystem 1112 and a RF unit 1114, and one or more antennas 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 5-9B. Instructions 1106 may also be referred to as code, which may be interpreted broadly to include any type of computer-readable statement(s) as discussed above with respect to FIG. 10.

The sidelink configuration module 1108 may be implemented via hardware, software, or combinations thereof. For example, the sidelink configuration module 1108 may be implemented as a processor, circuit, and/or instructions 1106 stored in the memory 1104 and executed by the processor 1102. In some instances, the sidelink configuration module 1108 can be integrated within the modem subsystem 1112. For example, the sidelink configuration module 1108 can be implemented by a combination of software components (e.g., executed by a DSP or a general processor) and hardware components (e.g., logic gates and circuitry) within the modem subsystem 1112.

The sidelink configuration module 1108 may be used for various aspects of the present disclosure, for example, aspects of FIGS. 5-9B. For instance, the sidelink configuration module 1108 may be configured to transmit, to a UE (e.g., the UEs 115, 215, and/or 1000), a sidelink configuration indicating a sidelink resource pool and/or a PSFCH configuration. The sidelink configuration may indicate time-frequency resources for a sidelink resource pool (e.g., the frequency band 301, the frequency subbands 302, the sidelink communication frame structure 304, allowable LBT starting points within an LBT gap duration) and/or sidelink traffic priority classes. Mechanisms for configuring sidelink UEs for channel access in a shared radio frequency band and/or an unlicensed band are described in greater detail herein.

As shown, the transceiver 1110 may include the modem subsystem 1112 and the RF unit 1114. The transceiver 1110 can be configured to communicate bi-directionally with other devices, such as the UEs 115 and/or 1000 and/or another core network element. The modem subsystem 1112 may be configured to modulate and/or encode data according to a MCS, e.g., a LDPC coding scheme, a turbo coding scheme, a convolutional coding scheme, a polar coding scheme, a digital beamforming scheme, etc. The RF unit 1114 may be configured to process (e.g., perform analog to digital conversion or digital to analog conversion, etc.) modulated/encoded data (e.g., PDCCH, PDSCH, SSBs, sidelink configuration, sidelink resource pool configuration) from the modem subsystem 1112 (on outbound transmissions) or of transmissions originating from another source such as a UE 115 and/or UE 1000. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. This may include, for example, transmission of information to complete attachment to a network and communication with a camped UE 115 or 1000 according to some aspects of the present disclosure. The antennas 1116 may further receive data messages transmitted from other devices and provide the received data messages for processing and/or demodulation at the transceiver 1110. The transceiver 1110 may provide the demodulated and decoded data to the sidelink configuration module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
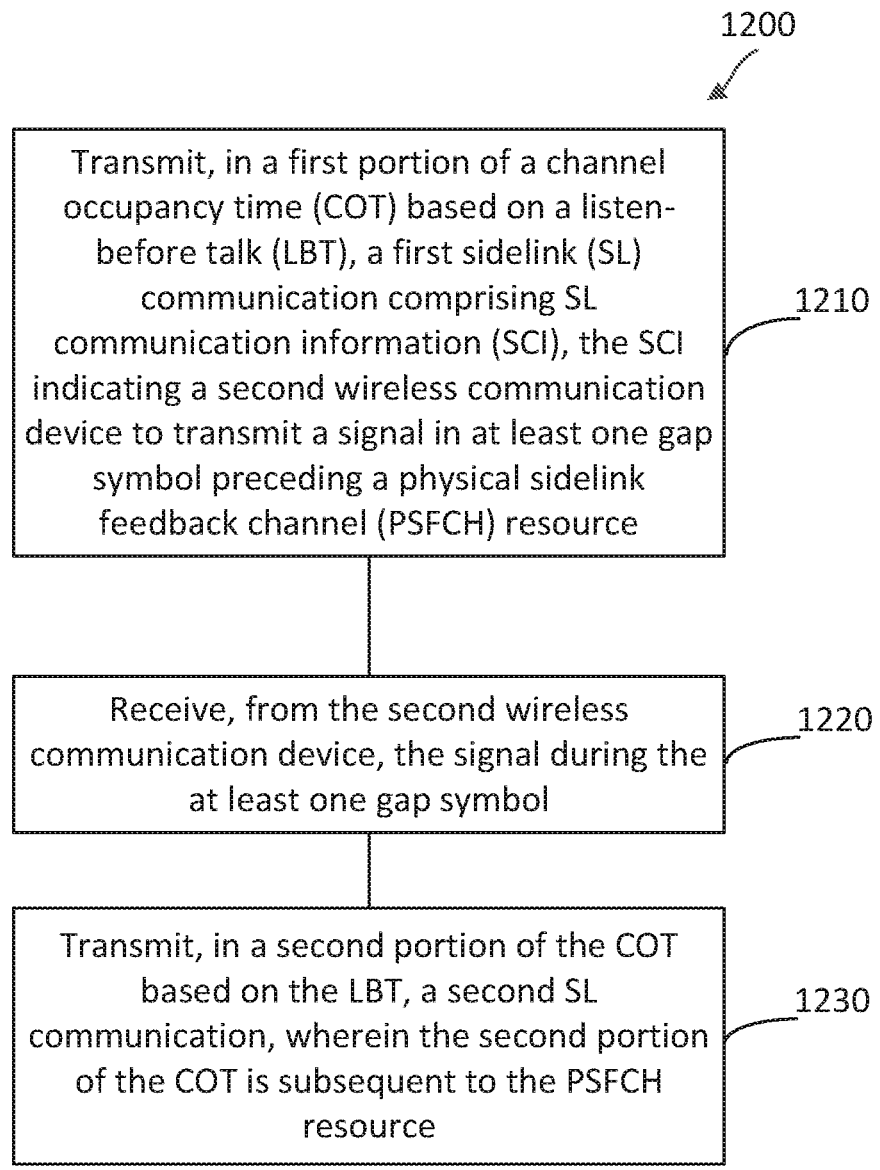
FIG. 12 is a flow diagram of a sidelink communication method according to some aspects of the present disclosure.

FIG. 12 is a flow diagram of a sidelink communication method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as the UEs 115, 215, and/or 1000, may utilize one or more components, such as the processor 1002, the memory 1004, the sidelink communication module 1008, the transceiver 1010, the modem 1012, and the one or more antennas 1016, to execute the steps of method 1200. The method 1200 may employ similar mechanisms as in the schemes 500, 600, 700, and/or 800 discussed above with respect to FIGS. 5, 6, 7, and 8, respectively. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1210, a first wireless communication device transmits, in a first portion of a channel occupancy time (COT) based on a listen-before-talk (LBT), a first sidelink (SL) communication comprising SL communication information (SCI). The SCI may indicate a second wireless communication device to transmit a signal in at least one gap symbol preceding a physical sidelink feedback channel (PSFCH). In some aspects, the method 1200 includes performing the LBT in a shared radio frequency band (e.g., the frequency band 301) within an LBT gap duration (e.g., the LBT gap duration 310). For example, the first wireless communication device may perform a CAT2 LBT, a CAT4 LBT, and/or any suitable type of LBT to initiate or acquire the COT. In some instances, the first wireless communication device may utilize one or more components, such as the processor 1002, the sidelink communication module 1008, the transceiver 1010, the modem 1012, and the one or more antennas 1016, to perform the LBT by measuring signal energy in the shared radio frequency band beginning at the first starting point and over a duration of a CCA slot (e.g., ending at a next starting point), comparing the channel signal measurement to a threshold, determining that the LBT is a pass (e.g., the channel is available) when the channel signal measurement is below the threshold, and determining that the LBT fails (e.g., channel is busy) when the channel signal measurement is above the threshold. In some aspects, transmitting the first SL communication may include transmitting SCI in a PSCCH and/or in a PSSCH. Further, transmitting the first SL communication may include transmitting SL data in a PSSCH. In some aspects, the communication may occur in one or more slots within the COT. The slot may include one or more symbols allocated for the PSFCH resource. For example, the slot may include, or be configured with, following the PSSCH resources, at least one first gap symbol, at least one AGC symbol, at least one PSFCH symbol, and at least a further gap symbol. In some aspects, the SCI indicates the second wireless communication device to transmit ACK/NACK in the PSFCH resource or instance and a cyclic prefix extension (CPE) in the first gap symbol preceding the PSFCH resource. In other aspects, the SCI indicates the second wireless communication device to transmit a PSFCH-based padding signal in the PSFCH resource with a CPE in the first gap symbol. In some aspects, the SCI indicates the second wireless communication device to transmit ACK/NACK for the SCI in the first SL communication. The first wireless communication device may utilize one or more components, such as the processor 1002, the sidelink communication module 1008, the transceiver 1010, the modem 1012, and the one or more antennas 1016, to perform the actions of block 1210.

At block 1220, the first wireless communication device receives, from the second wireless communication device in the shared frequency band, the signal during the at least one gap symbol. As mentioned above, receiving the signal may include receiving a PSFCH with CPE. In some aspects, the PSFCH may indicate ACK/NACK for one or more PSSCH communications in one or more PSFCH periods associated with the PSFCH resource. In some aspects, the PSFCH may indicate ACK/NACK for the first SL communication. For example, the PSFCH may indicate ACK/NACK for SCI included in the first SL communication. The first wireless communication device may utilize one or more components, such as the processor 1002, the sidelink communication module 1008, the transceiver 1010, the modem 1012, and the one or more antennas 1016, to perform the actions of block 1220.

At block 1230, the first wireless communication device transmits, in a second portion of the COT based on the LBT, a second SL communication. In some aspects, the second portion of the COT is subsequent to the PSFCH resource. For example, the first portion of the COT may be in a first slot within the COT, and the second portion of the COT may be in a second slot within the COT. In some aspects, transmitting the second SL communication may include transmitting a PSCCH and/or a PSSCH communication. In this regard, based on receiving the signal during the at least one gap symbol, at block 1220, the first wireless communication device may maintain the COT such that the first wireless communication device may resume communications within the COT after the PSFCH resource and without performing an additional LBT. The first wireless communication device may utilize one or more components, such as the processor 1002, the sidelink communication module 1008, the transceiver 1010, the modem 1012, and the one or more antennas 1016, to perform the actions of block 1230.

Figure 13:
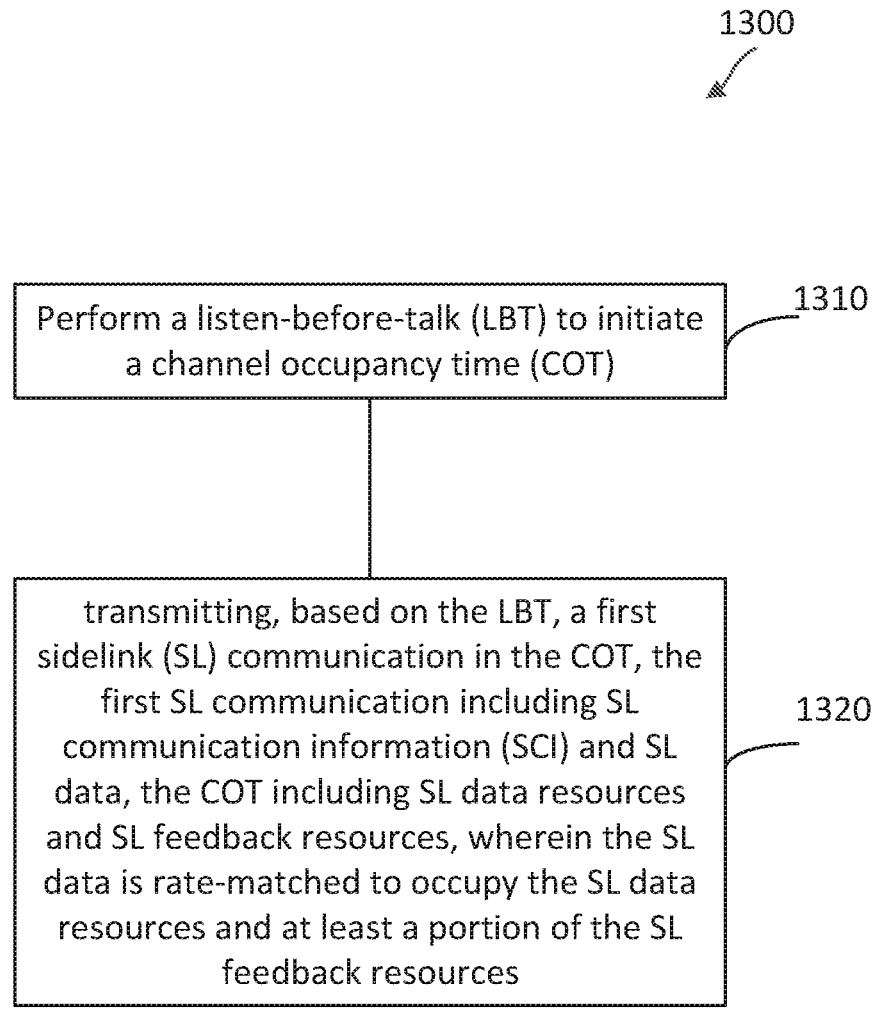
FIG. 13 is a flow diagram of a sidelink communication method according to some aspects of the present disclosure.

FIG. 13 is a flow diagram of a sidelink communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the UEs 115, 215, and/or 1000, may utilize one or more components, such as the processor 1002, the memory 1004, the sidelink communication module 1008, the transceiver 1010, the modem 1012, and the one or more antennas 1016, to execute the steps of method 1300. The method 1300 may employ similar mechanisms as in the method 800 illustrated in FIGS. 8-9B. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a first wireless communication device performs a listen-before talk (LBT) in a shared radio frequency band to initiate a channel occupancy time (COT). For example, the first wireless communication device may perform a CAT2 LBT, a CAT4 LBT, and/or any suitable type of LBT to initiate or acquire the COT. In some instances, the first wireless communication device may utilize one or more components, such as the processor 1002, the sidelink communication module 1008, the transceiver 1010, the modem 1012, and the one or more antennas 1016, to perform the LBT by measuring signal energy in the shared radio frequency band beginning at the first starting point and over a duration of a CCA slot (e.g., ending at a next starting point), comparing the channel signal measurement to a threshold, determining that the LBT is a pass (e.g., the channel is available) when the channel signal measurement is below the threshold, and determining that the LBT fails (e.g., channel is busy) when the channel signal measurement is above the threshold. The first wireless communication device may utilize one or more components, such as the processor 1002, the sidelink communication module 1008, the transceiver 1010, the modem 1012, and the one or more antennas 1016, to perform the actions of block 1310.

At block 1320, the first wireless communication device transmits, based on the LBT, a first SL communication in the COT, where the first SL communication is rate matched to occupy at least a portion of SL feedback resources during the COT. For example, the first wireless communication device may transmit the first SL communication including SCI and SL data. The COT may include SL data resources and SL feedback resources. In some aspects, the SL feedback resources may include one or more PSFCH instances or symbols. In some aspects, transmitting the first SL communication may include transmitting SCI in a PSCCH and/or in a PSSCH. In a further aspect, the first SL communication may include a PSSCH communication. The first wireless communication device may rate match at least a portion of the PSSCH communication to occupy at least a portion of the SL data resources and the SL feedback resources. For example, the first wireless communication device may rate match the PSSCH communication to extend within at least one of a gap symbol, an AGC symbol, and/or a PSFCH symbol of the slot. Based on transmitting the rate matched first SL communication, the first wireless communication device may continue to perform SL communications in the COT in additional time resources. For example, the first wireless communication device may communicate additional PSCCH and/or PSSCH communications in one or more slots in the COT following the SL feedback resources. The first wireless communication device may utilize one or more components, such as the processor 1002, the sidelink communication module 1008, the transceiver 1010, the modem 1012, and the one or more antennas 1016, to perform the actions of block 1320.

Exemplary Aspects of the Disclosure

Aspect 1. A method of wireless communication performed by a first wireless communication device, the method comprising: transmitting, in a first portion of a channel occupancy time (COT) based on a listen-before talk (LBT), a first sidelink (SL) communication comprising SL communication information (SCI), the SCI indicating a second wireless communication device to transmit a signal in at least one gap symbol preceding a physical sidelink feedback channel (PSFCH) resource; receiving, from the second wireless communication device, the signal during the at least one gap symbol; and transmitting, in a second portion of the COT based on the LBT, a second SL communication, wherein the second portion of the COT is subsequent to the PSFCH resource.

Aspect 2. The method of aspect 1, wherein the receiving the signal comprises receiving a physical sidelink feedback channel (PSFCH) signal and the signal, wherein the signal comprises a first cyclic prefix (CP) preceding the PSFCH signal within the at least one gap symbol.

Aspect 3. The method of aspect 2, wherein the SCI indicates the second wireless communication device to transmit the signal such that a duration between an end of the first portion of the COT and a beginning of the signal is less than or equal to 25 µs.

Aspect 4. The method of any of aspects 2-3, wherein the transmitting the second SL communication comprises transmitting: a physical sidelink shared channel (PSSCH) signal in the second portion of the COT; and a second CP in a gap period between the PSFCH signal and the second portion of the COT.

Aspect 5. The method of aspect 4, wherein the PSSCH signal comprises an acknowledgement/non-acknowledgement (ACK/NACK) for decoding the SCI.

Aspect 6. The method of any of aspects 2-5, wherein the receiving the signal comprises receiving a PSFCH-based padding signal in the PSFCH resource and a first cyclic prefix (CP) preceding the PSFCH-based padding signal in the at least one gap symbol.

Aspect 7. The method of aspect 6, wherein the SCI indicates one or more PSFCH resources and a slot index, the one or more PSFCH resources including the PSFCH resource, and wherein the SCI indicates the second wireless communication device to transmit the PSFCH-based padding signal in each PSFCH resource of the one or more PSFCH occasions before a slot associated with the slot index.

Aspect 8. The method of any of aspects 6-7, wherein the PSFCH resource is orthogonal to at least a second PSFCH resource for communication of PSFCH resources by a third wireless communication device.

Aspect 9. The method of aspect 8, wherein the PSFCH resource is selected based on an identifier of the first wireless communication device.

Aspect 10. The method of any of aspects 8-9, wherein the PSFCH resource comprises a reserved PSFCH resource.

Aspect 11. A method of wireless communication performed by a first wireless communication device, the method comprising: performing a listen-before-talk (LBT) to initiate a channel occupancy time (COT); and transmitting, based on the LBT, a first sidelink (SL) communication in the COT, the first SL communication including SL communication information (SCI) and SL data, the COT including SL data resources and SL feedback resources, wherein the SL data is rate-matched to occupy the SL data resources and at least a portion of the SL feedback resources.

Aspect 12. The method of aspect 11, wherein: the SL feedback resources comprise at least one gap symbol, at least one automatic gain control (AGC) symbol, and at least one physical sidelink feedback channel (PSFCH) symbol; and the SL data is rate-matched to occupy the at least one gap symbol, the at least one AGC symbol, and the at least one PSFCH symbol.

Aspect 13. The method of any of aspects 11-12, wherein the SCI indicates, to a second wireless communication device, a rate-matching behavior for the COT.

Aspect 14. A first wireless communication device comprising a memory, a transceiver, and a processor in communication with the memory and the transceiver, wherein the first wireless communication device is configured to perform the steps of any of aspects 1-10.

Aspect 15. A first wireless communication device comprising a memory, a transceiver, and a processor in communication with the memory and the transceiver, wherein the first wireless communication device is configured to perform the steps of any of aspects 11-13.

Aspect 16. A non-transitory, computer-readable medium having program code recorded thereon, the program code comprising instructions executable by a processor of a first wireless communication device to cause the first wireless communication device to perform the steps of any of aspects 1-10.

Aspect 17. A non-transitory, computer-readable medium having program code recorded thereon, the program code comprising instructions executable by a processor of a first wireless communication device to cause the first wireless communication device to perform the steps of any of aspects 11-13.

Aspect 18. A first wireless communication device comprising means for performing the steps of any of aspects 1-10.

Aspect 19. A first wireless communication device comprising means for performing the steps of any of aspects 11-13.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspect illustrated and described herein, as they are merely by way of some examples thereof, but rather, should be fully commensurate with that of the claims appended hereafter and their functional equivalents.

What is claimed is:

1. A method of wireless communication performed by a first wireless communication device, the method comprising:

transmitting, in a first portion of a slot of a channel occupancy time (COT) based on a listen-before talk (LBT), a first sidelink (SL) communication comprising SL communication information (SCI), the SCI indicating a second wireless communication device to transmit a signal in at least one gap symbol of the slot, the at least one gap symbol preceding a physical sidelink feedback channel (PSFCH) resource such that a remaining gap duration between an end of the first portion of the slot of the COT and a beginning of the signal is less than a threshold;

receiving, from the second wireless communication device, the signal during the at least one gap symbol; and transmitting, in a second portion of the COT based on the LBT, a second SL communication, wherein the second portion of the COT is subsequent to the PSFCH resource.

2. The method of claim 1, wherein the receiving the signal comprises receiving a physical sidelink feedback channel (PSFCH) signal and the signal, wherein the signal comprises a first cyclic prefix (CP) preceding the PSFCH signal within the at least one gap symbol.

3. The method of claim 2, wherein the threshold is less than or equal to 25 µs.

4. The method of claim 2, wherein the transmitting the second SL communication comprises transmitting:
a physical sidelink shared channel (PSSCH) signal in the second portion of the COT; and
a second CP in a gap period between the PSFCH signal and the second portion of the COT.

5. The method of claim 4, wherein the PSSCH signal comprises an acknowledgement/non-acknowledgement (ACK/NACK) for decoding the SCI.

6. The method of claim 1, wherein the receiving the signal comprises receiving a PSFCH-based padding signal in the PSFCH resource and a first cyclic prefix (CP) preceding the PSFCH-based padding signal in the at least one gap symbol.

7. The method of claim 6, wherein the SCI indicates one or more PSFCH resources and a slot index, the one or more PSFCH resources including the PSFCH resource, and wherein the SCI indicates the second wireless communication device to transmit the PSFCH-based padding signal in each PSFCH resource of the one or more PSFCH occasions before a slot associated with the slot index.

8. The method of claim 6, wherein the PSFCH resource is orthogonal to at least a second PSFCH resource for communication of PSFCH resources by a third wireless communication device.

9. The method of claim 8, wherein the PSFCH resource is selected based on an identifier of the first wireless communication device.

10. The method of claim 8, wherein the PSFCH resource comprises a reserved PSFCH resource.

11. A method of wireless communication performed by a first wireless communication device, the method comprising:
performing a listen-before-talk (LBT) to initiate a channel occupancy time (COT); and
transmitting, in a first portion of a slot based on the LBT, a first sidelink (SL) communication the COT, the first SL communication including SL communication information (SCI) and SL data, the COT including SL data resources and SL feedback resources, wherein the SL feedback resources comprise at least one gap symbol of the slot, wherein the SL data is rate-matched to occupy the SL data resources and at least a portion of the SL feedback resources, the portion of the SL feedback resources comprising the at least one gap symbol of the slot.

12. The method of claim 11, wherein:
the SL feedback resources further comprise at least one automatic gain control (AGC) symbol, and at least one physical sidelink feedback channel (PSFCH) symbol; and
the SL data is rate-matched to occupy the at least one AGC symbol, and the at least one PSFCH symbol.

13. The method of claim 11, wherein the SCI indicates, to a second wireless communication device, a rate-matching behavior for the COT.

14. A first wireless communication device, comprising:
a memory;
a transceiver; and
a processor in communication with the memory and the transceiver, wherein the first wireless communication device is configured to:
transmit, in a first portion of a slot of a channel occupancy time (COT) based on a listen-before talk (LBT), a first sidelink (SL) communication comprising SL communication information (SCI), the SCI indicating a second wireless communication device to transmit a signal in at least one gap symbol of the slot, the at least one gap symbol preceding a physical sidelink feedback channel (PSFCH) resource such that a remaining gap duration between an end of the first portion of the slot of the COT and a beginning of the signal is less than a threshold;
receive, from the second wireless communication device, the signal during the at least one gap symbol; and
transmit, in a second portion of the COT based on the LBT, a second SL communication, wherein the second portion of the COT is subsequent to the PSFCH resource.

15. The first wireless communication device of claim 14, wherein the first wireless communication device configured to receive the signal comprises the first wireless communication device configured to receive a physical sidelink feedback channel (PSFCH) signal and the signal, wherein the signal comprises a first cyclic prefix (CP) preceding the PSFCH signal within the at least one gap symbol.

16. The first wireless communication device of claim 15, wherein the threshold is less than or equal to 25 µs.

17. The first wireless communication device of claim 15, wherein the first wireless communication device configured to transmit the second SL communication comprises the first wireless communication device configured to transmit:
a physical sidelink shared channel (PSSCH) signal in the second portion of the COT; and
a second CP in a gap period between the PSFCH signal and the second portion of the COT.

18. The first wireless communication device of claim 17, wherein the PSSCH signal comprises an acknowledgement/non-acknowledgement (ACK/NACK) for decoding the SCI.

19. The first wireless communication device of claim 14, wherein the first wireless communication device configured to receive the signal comprises the first wireless communication device configured to receive a PSFCH-based padding signal in the PSFCH resource and a first cyclic prefix (CP) preceding the PSFCH-based padding signal in the at least one gap symbol.

20. The first wireless communication device of claim 19, wherein the SCI indicates one or more PSFCH resources and a slot index, the one or more PSFCH resources including the PSFCH resource, and wherein the SCI indicates the second wireless communication device to transmit the PSFCH-based padding signal in each PSFCH resource of the one or more PSFCH occasions before a slot associated with the slot index.

21. The first wireless communication device of claim 19, wherein the PSFCH resource is orthogonal to at least a second PSFCH resource for communication of PSFCH resources by a third wireless communication device.

22. The first wireless communication device of claim 21, wherein the PSFCH resource is selected based on an identifier of the first wireless communication device.

23. The first wireless communication device of claim 21, wherein the PSFCH resource comprises a reserved PSFCH resource.

24. A first wireless communication device, comprising:
a memory;
a transceiver; and
a processor in communication with the memory and the transceiver, wherein the first wireless communication device is configured to:
  perform a listen-before-talk (LBT) to initiate a channel occupancy time (COT); and
  transmit, in a first portion of a slot based on the LBT, a first sidelink (SL) communication in the COT, the first SL communication including SL communication information (SCI) and SL data, the COT including SL data resources and SL feedback resources, wherein the SL feedback resources comprise at least one gap symbol of the slot, wherein the SL data is rate-matched to occupy the SL data resources and at least a portion of the SL feedback resources, the portion of the SL feedback resources comprising the at least one gap symbol of the slot.

25. The first wireless communication device of claim 24, wherein:
the SL feedback resources further comprise at least one automatic gain control (AGC) symbol, and at least one physical sidelink feedback channel (PSFCH) symbol; and
the SL data is rate-matched to occupy the at least one AGC symbol, and the at least one PSFCH symbol.

26. The first wireless communication device of claim 24, wherein the SCI indicates, to a second wireless communication device, a rate-matching behavior for the COT.

* * * * *